(12) United States Patent
Marin

(10) Patent No.: US 8,660,547 B2
(45) Date of Patent: Feb. 25, 2014

(54) OPTIMIZED ENERGY CONSUMPTION MANAGEMENT IN WIRELESS BASE STATIONS

(75) Inventor: James S. Marin, Murphy, TX (US)

(73) Assignee: Nokia Siemens Networks Oy, Espoo (FI)

( * ) Notice: Subject to any disclaimer, the term of this patent is extended or adjusted under 35 U.S.C. 154(b) by 35 days.

(21) Appl. No.: 13/307,595

(22) Filed: Nov. 30, 2011

(65) Prior Publication Data

US 2013/0137411 A1    May 30, 2013

(51) Int. Cl.
*H04W 52/02*    (2009.01)

(52) U.S. Cl.
USPC .......................................... 455/418; 370/252

(58) Field of Classification Search
USPC .......... 455/418, 574, 41.2; 370/252, 400, 338
See application file for complete search history.

(56) References Cited

U.S. PATENT DOCUMENTS

| | | | |
|---|---|---|---|
| 6,584,330 B1 | 6/2003 | Ruuska | |
| 2009/0068969 A1 | 3/2009 | Lindoff et al. | 455/161.1 |
| 2011/0019560 A1* | 1/2011 | Karaoguz et al. | 370/252 |
| 2012/0057503 A1 | 3/2012 | Ding et al. | |
| 2013/0003574 A1* | 1/2013 | Hayashi et al. | 370/252 |

FOREIGN PATENT DOCUMENTS

| | | |
|---|---|---|
| EP | 2056628 A1 | 5/2009 |
| EP | 2273827 A1 | 1/2011 |
| WO | WO-0207464 A1 | 1/2002 |
| WO | WO-2009031956 A1 | 3/2009 |
| WO | WO-2010108138 A2 | 9/2010 |
| WO | WO 2010130104 A1 | 11/2010 |
| WO | WO-2010151184 A1 | 12/2010 |
| WO | WO-2011006847 A1 | 1/2011 |
| WO | WO-2011041406 A1 | 4/2011 |
| WO | WO-2011047599 A1 | 4/2011 |
| WO | WO 2011120554 A1 | 10/2011 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; 3GPP TS 36.300 V8.12.0, Mar. 2010, 149 pgs.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)"; 3GPP TS 36.300 V9.7.0, Mar. 2011, 174 pgs.

(Continued)

*Primary Examiner* — Phuoc H Doan
(74) *Attorney, Agent, or Firm* — Harrington & Smith

(57) ABSTRACT

A method, apparatus and a non-transitory computer readable medium include comparing two or more access points in a wireless communication network based upon one or more scenarios to minimize energy consumption, identifying one or more energy conservation constraints in the wireless communication network and controlling each of the two or more access points by selectively distributing traffic based upon the one or more energy conservation constraints.

21 Claims, 13 Drawing Sheets

(56) References Cited

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)"; 3GPP TS 36.300 V10.4.0, Jun. 2011, 194 pgs.

"3rd Generation Partnership Project; Technical Specification Group Services and System Aspects; 3GPP System Architecture Evolution: GPRS enhancements for LTE access; Release 8", 3GPP TS 23.401 V0.0.0, Dec. 2006, 8 pgs.

"3rd Generation Partnership Project; Technical Specification Group Radio Access Network; Requirements for further advancements for Evolved Universal Terrestrial Radio Access (E-UTRA) (LTE-Advanced) (Release 8)", 3GPP TR 36.913 V8.0.1, Mar. 2009, 15 pgs.

"3rd Generation Partnership Project; Technical Specification Group Radio Access Network; Requirements for further advancements for Evolved Universal Terrestrial Radio Access (E-UTRA) (LTE-Advanced) (Release 9)", 3GPP TR 36.913 V9.0.0, Dec. 2009, 15 pgs.

"3rd Generation Partnership Project; Technical Specification Group Radio Access Network; Requirements for further advancements for Evolved Universal Terrestrial Radio Access (E-UTRA) (LTE-Advanced) (Release 10)", 3GPP TR 36.913 V 10.0.0, Mar. 2011, 15 pgs.

Marin, Scott and Naveen, Arulselven. "Energy Saving Mode Architecture Thoughts" *3GPP2*, A30-20110328-007r0 ES-mode architecture MotSo comments.ppt.

Lizhiming. "Energy Saving Introduction of 3GPP", *3GPP2*, A30-20110328-009r0 HW Energy Saving Introduction of 3GPP.pdf.

Xu, Mingxia and Lizhiming. "Power Management Notification of the Sector,"*3GPP2*, A30-20110328-010r0 HW Power management notification.pptx.

Xu, Mingxia and Lizhiming. "Power ManagementNotification of the Sector," *3GPP2*, A30-20110328-011r0-HW Power management notification of the Sector.doc.

Dolan, Mike and Kanugovi, Satish. "Energy Saving Mode Architecture Proposal,"*3GPP2*, A30-20110328-012r0 ALU ES-mode architecture.ppt, Mar. 2011.

Yu, Yuanfang; Lu, Ting; Zhou, Xiaowu; and Fang, Yonggang. "Enhanced A Interface for interBS Energy Saving," *3GPP2*, A30-20110328-016r0 ZTE Enhanced A interface for inter-BS Energy Saving.pdf.

Ericsson AB white paper Sustainable energy use in mobile communications, Jun. 2007.

NEC, Feb. 2009, NEC's proposals for next-generation radio network management, Self Organizing Network NEC's proposals for next-generation . . . , SON_whitePaper_V19_clean.pdf.

3GPP TR 36.902 version 9.1.0 Release 9, "LTE; evolved universal terrestrial radio access network (E-UTRAN); self-configuring and self optimizing network (SON) use cases and solutions," Tech. Report, 2010.

Yinan Qi; Imran, M.; Tafazolli, R.; On the energy aware deployment strategy in cellular systems, Personal, Indoor and Mobile Radio Communications Workshops (PIMRC Workshops), 2010 IEEE 21st International Symposium on, Digital Object Identifier: 10.1109/PIMRCW.2010.5670395, Publication Year: 2010 , pp. 363-367.

F. Richter, A. J. Fehske, and G. P. Fettweis, "Energy Efficiency Aspects of Base Station Deployment Strategies for Cellular Networks," in Proc. of VTC2009-Fall, pp. 1-5, Anchorage, Alaska, USA, Sep. 2009.

M. A. Marsan, L. Chiaraviglio, D. Ciullo, and M. Meo, "Optimal Energy Savings in Cellular Access Networks," in Proc. of ICC2009 Communications Workshops, pp. 1-5, Dresden, Germany, Jun. 2009.

Hossain, M.F.; Munasinghe, K.S.; Jamalipour, A.;, "An eco-inspired energy efficient access network architecture for next generation cellular systems," Wireless Communications and Networking Conference (WCNC), 2011 IEEE , vol., No., pp. 992-997, Mar. 28-31, 2011 doi: 10.1109/WCNC.2011.5779271.

"Power Management Way Forward", Mingxia Xu and Li Zhiming, 3GPP2 TSG-A WG3, 2 pages.

"Remote Radio Heads and the evolution towards 4G networks", Feb. 2009, Lanzani et al., 5 pages, Radiocomp, Altera.

"Techniques for Improving Cellular Radio Base Station Energy Efficiency" Oct. 2011,McLaughlin et al., IEEE Wireless Communications, pp. 10-17.

\* cited by examiner

| FIG.7A |
| FIG.7B |

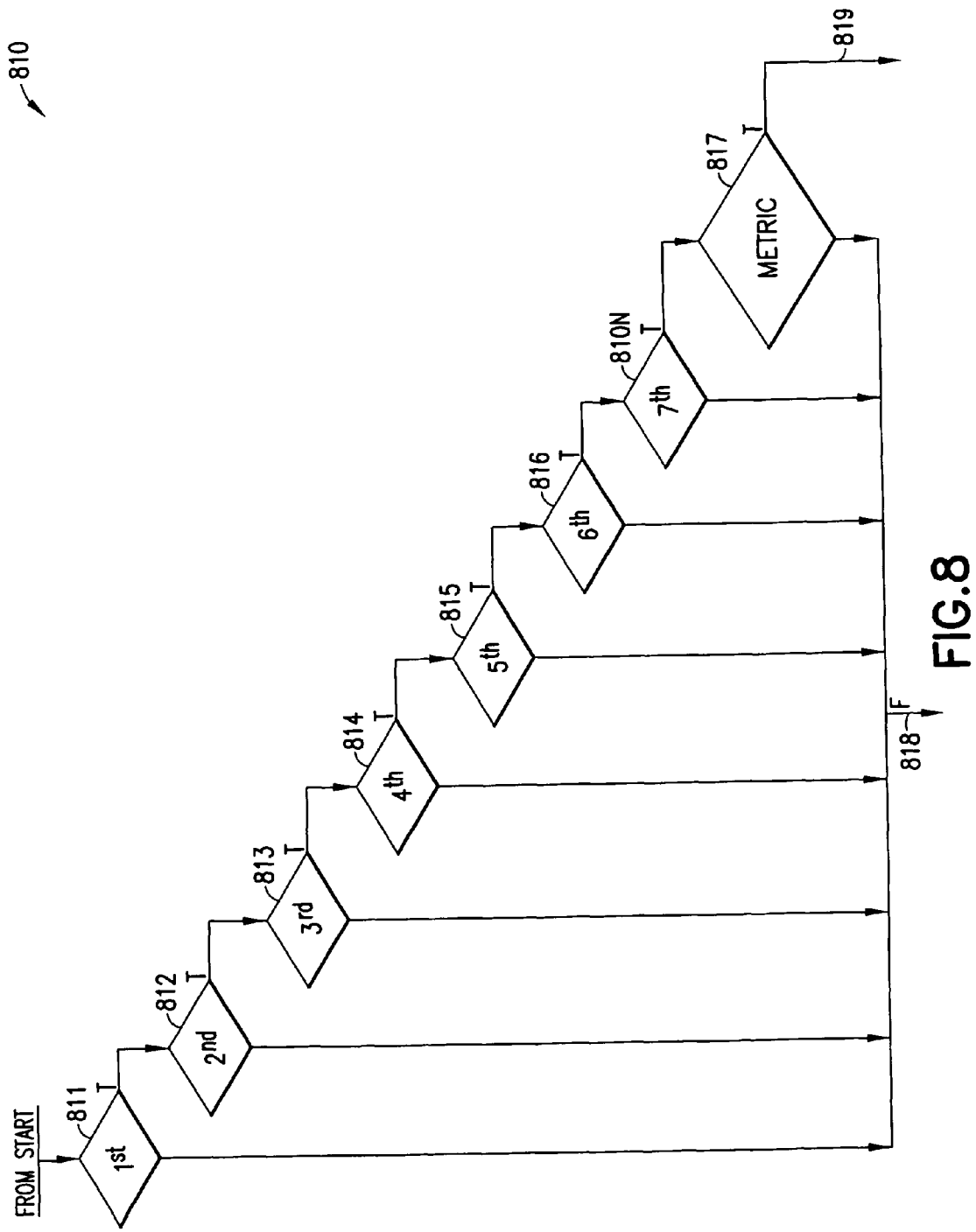

| i | r1 | r2 | e11on | e12on | e21on | e22on | rc1 | rc2 | |
|---|---|---|---|---|---|---|---|---|---|
| 003 | 0.219 | 0.527 | 0 | 1 | 0 | 1 | 0.000 | 0.746 | ENERGY SAVINGS, e1 OFF |
| 008 | 0.047 | 0.092 | 0 | 1 | 0 | 1 | 0.000 | 0.139 | ENERGY SAVINGS, e1 OFF |
| 013 | 0.679 | 0.654 | 1 | 1 | 1 | 1 | 0.679 | 0.654 | NORMAL |
| 018 | 0.679 | 0.416 | 1 | 0 | 1 | 0 | 1.095 | 0.000 | ENERGY SAVINGS, e2 OFF |
| 023 | 0.935 | 0.701 | 1 | 1 | 1 | 1 | 0.935 | 0.701 | NORMAL |
| 028 | 0.384 | 0.910 | 1 | 1 | 1 | 1 | 0.384 | 0.910 | NORMAL |
| 033 | 0.519 | 0.762 | 1 | 1 | 1 | 1 | 0.519 | 0.762 | NORMAL |
| 038 | 0.831 | 0.262 | 1 | 0 | 1 | 0 | 1.093 | 0.000 | ENERGY SAVINGS, e2 OFF |
| 043 | 0.035 | 0.047 | 0 | 1 | 0 | 1 | 0.000 | 0.082 | ENERGY SAVINGS, e1 OFF |
| 048 | 0.053 | 0.736 | 0 | 1 | 0 | 1 | 0.000 | 0.790 | ENERGY SAVINGS, e1 OFF |
| 053 | 0.530 | 0.328 | 0 | 1 | 0 | 1 | 0.000 | 0.858 | ENERGY SAVINGS, e1 OFF |
| 058 | 0.671 | 0.633 | 1 | 1 | 1 | 1 | 0.671 | 0.633 | NORMAL |
| 063 | 0.008 | 0.756 | 0 | 1 | 0 | 1 | 0.000 | 0.764 | ENERGY SAVINGS, e1 OFF |
| 068 | 0.383 | 0.991 | 1 | 1 | 1 | 1 | 0.383 | 0.991 | SWAP POSSIBLE |
| 073 | 0.067 | 0.365 | 0 | 1 | 0 | 1 | 0.000 | 0.432 | ENERGY SAVINGS, e1 OFF |
| 078 | 0.417 | 0.247 | 0 | 1 | 0 | 1 | 0.000 | 0.665 | ENERGY SAVINGS, e1 OFF |
| 083 | 0.687 | 0.983 | 1 | 1 | 1 | 1 | 0.687 | 0.983 | SWAP POSSIBLE |
| 088 | 0.589 | 0.723 | 1 | 1 | 1 | 1 | 0.589 | 0.723 | NORMAL |
| 093 | 0.930 | 0.753 | 1 | 1 | 1 | 1 | 0.930 | 0.753 | NORMAL |
| 098 | 0.846 | 0.652 | 1 | 1 | 1 | 1 | 0.846 | 0.652 | NORMAL |
| 20 DATA-RATE SAMPLES DISPLAYED | | | | | | | | | |

FIG. 10

OPTIMIZED ENERGY CONSUMPTION MANAGEMENT IN WIRELESS BASE STATIONS

TECHNICAL FIELD

The exemplary and non-limiting embodiments of this invention relate generally to wireless communication systems, methods, devices and computer programs and, more specifically, relates to optimizing power in a wireless communication network.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Wireless communications networks have expanded significantly, thereby increasing redundant coverage in most populated areas and providing multiple access points for user equipment (e.g., cell phones, smart phones, laptop computers and tablets). As such, user equipment typically has the potential choice of establishing communications with more than one access point. The connection can be established with more than one base station, sectors within a base station, or channels within a sector. With the proliferation of these access points comes increased power consumption due to the common practice in conventional systems of leaving the base station transmitters turned on at all times (even when the traffic flowing through the transmitters is far below the capacity of the transmitters).

The following abbreviations that may be found in the specification and/or the drawing figures are defined as follows:

3GPP third generation partnership project
ASIC application specific integrated circuit
BS base station
CN core network
CSG closed subscriber group
DL downlink (eNB towards UE)
DPC distributed power controller
DSP digital signal processor
DTC distributed traffic controller
eNB E-UTRAN Node B (evolved Node B)
EPC evolved packet core
ES energy savings
E-UTRAN evolved UTRAN (LTE)
FIFO first in first out
FPGA field programmable gate array
HSPA high speed packet access
IMT-A international mobile telephony-advanced
ITU international telecommunication union
ITU-R ITU radiocommunication sector
LTE long term evolution of UTRAN (E-UTRAN)
LTE-A LTE advanced
MAC medium access control (layer 2, L2)
MM/MME mobility management/mobility management entity
Node B base station
O&M operations and maintenance
OAM&P operations, administration, maintenance, and provisioning
PC power constraint
PDCP packet data convergence protocol
PHY physical (layer 1, L1)
QoS quality of service
RAN1 technical specification group radio access network working group 1
Rel release
RBS radio base station
RF radio frequency
RLC radio link control
RRC radio resource control
RRM radio resource management
S-GW serving gateway
UE user equipment, such as a mobile station, mobile node or mobile terminal
UL uplink (UE towards eNB)
UTRAN universal terrestrial radio access network

SUMMARY

In a first aspect thereof the exemplary embodiments of this invention provide a method comprising comparing two or more access points in a wireless communication network based upon one or more scenarios to minimize energy consumption, identifying one or more energy conservation constraints in the wireless communication network and controlling each of the two or more access points by selectively distributing traffic based upon the one or more energy conservation constraints.

In a second aspect thereof the exemplary embodiments of this invention provide an apparatus comprising a processor and a memory including computer program code, where the memory and computer program code are configured, with the processor, to cause the apparatus to compare two or more access points in a wireless communication network based upon one or more scenarios to minimize energy consumption, identify one or more energy conservation constraints in the wireless communication network and control each of the two or more access points by selectively distributing traffic base based upon the one or more energy conservation constraints.

In a third aspect thereof the exemplary embodiments of this invention provide an a non-transitory computer readable medium storing a program of machine-readable instructions executable by a digital processing apparatus of a computer system to perform operations for controlling computer system, said actions comprising comparing two or more access points in a wireless communication network based upon one or more scenarios to minimize energy consumption, identifying one or more energy conservation constraints in the wireless communication network, and controlling each of the two or more access points by selectively distributing traffic based upon the one or more energy conservation constrains constraints.

BRIEF DESCRIPTION OF THE DRAWINGS

The following discussion of the exemplary embodiments of this invention is made more evident in the following Detailed Description, when read in conjunction with the attached Drawing Figures, wherein:

FIG. 8 is a non-limiting example of an energy conservation constraint decision tree for carrying out one or more embodiments of this invention;

FIG. 10 is an illustration of a non-limiting example of a simulation of the functional operation of the distributed power and traffic control methods and computer programs suitable for use in practicing the exemplary embodiments of this invention; and

DETAILED DESCRIPTION

The exemplary embodiments of this invention provide an apparatus, methods, and computer programs that optimize power (i.e. minimize energy) consumption in a wireless communication network by distributing traffic loads among a plurality access points based upon one or more criterion.

A short description and references to the relevant portions of the UTRAN and LTE-A specifications are set forth below prior to a description of wireless communication coverage areas, as well as traffic re-assignment in a wireless communication system. Thereafter, a description is provided of various exemplary electronic devices and apparatuses that are suitable for use in practicing the exemplary embodiments of this invention. A description follows of the various methods and computer programs that optimize power on a wireless access point by distributing loads based upon one or more criteria.

(a) UTRAN and LTE-A Specifications

One specification of interest is 3GPP TS 36.300, V8.12.0 (2010-04), 3GPP TSG RAN1; Evolved Universal Terrestrial Radio Access (E-UTRA) and Evolved Universal Terrestrial Access Network (E-UTRAN); Overall description; Stage 2 (Release 8)," incorporated by reference herein in its entirety. This system may be referred to for convenience as LTE Rel-8 (which also contains 3G HSPA and its improvements). In general, the set of specifications given generally as 3GPP TS 36.xyz (e.g., 36.211, 36.311, 36.312, etc.) may be seen as describing the Release 8 LTE system. Release 9 versions of these specifications have been published, including 3GPP TS 36.300, V9.7.0 (2011-3), incorporated by reference herein in its entirety. Release 10 versions of these specifications have been published, including 3GPP TS 36.300, V10.4.0 (2011-06), incorporated by reference herein in its entirety.

Figure 1:
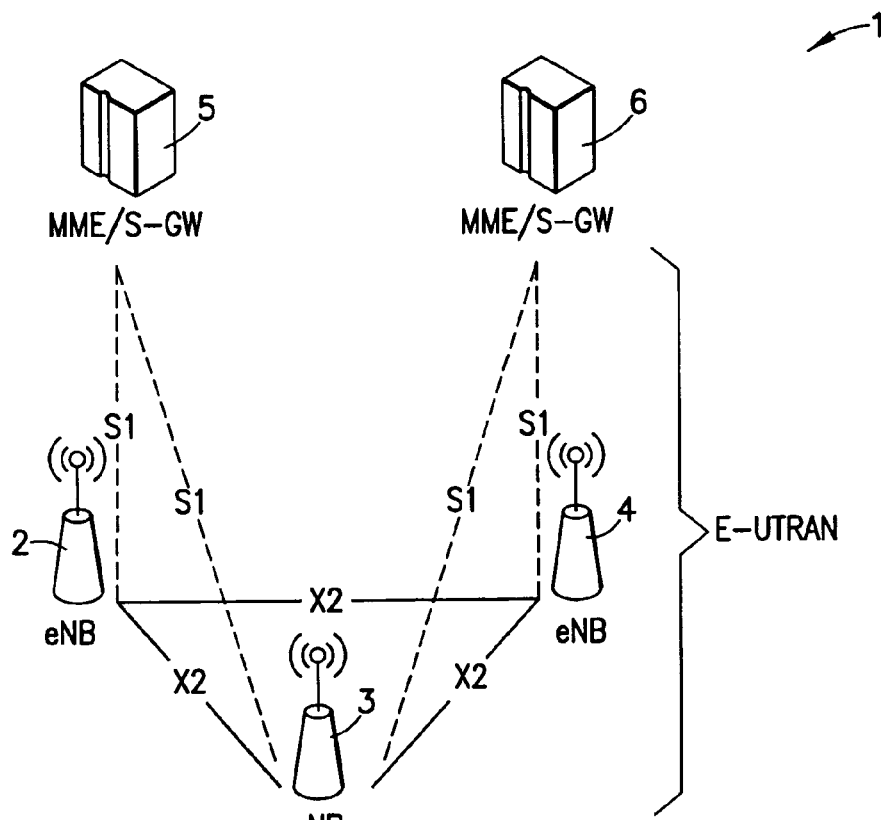
FIG. 1 reproduces FIG. 4-1 of 3GPP TS 36.300 V8.12.0, and shows the overall architecture of the E-UTRAN system.
Figure 4:
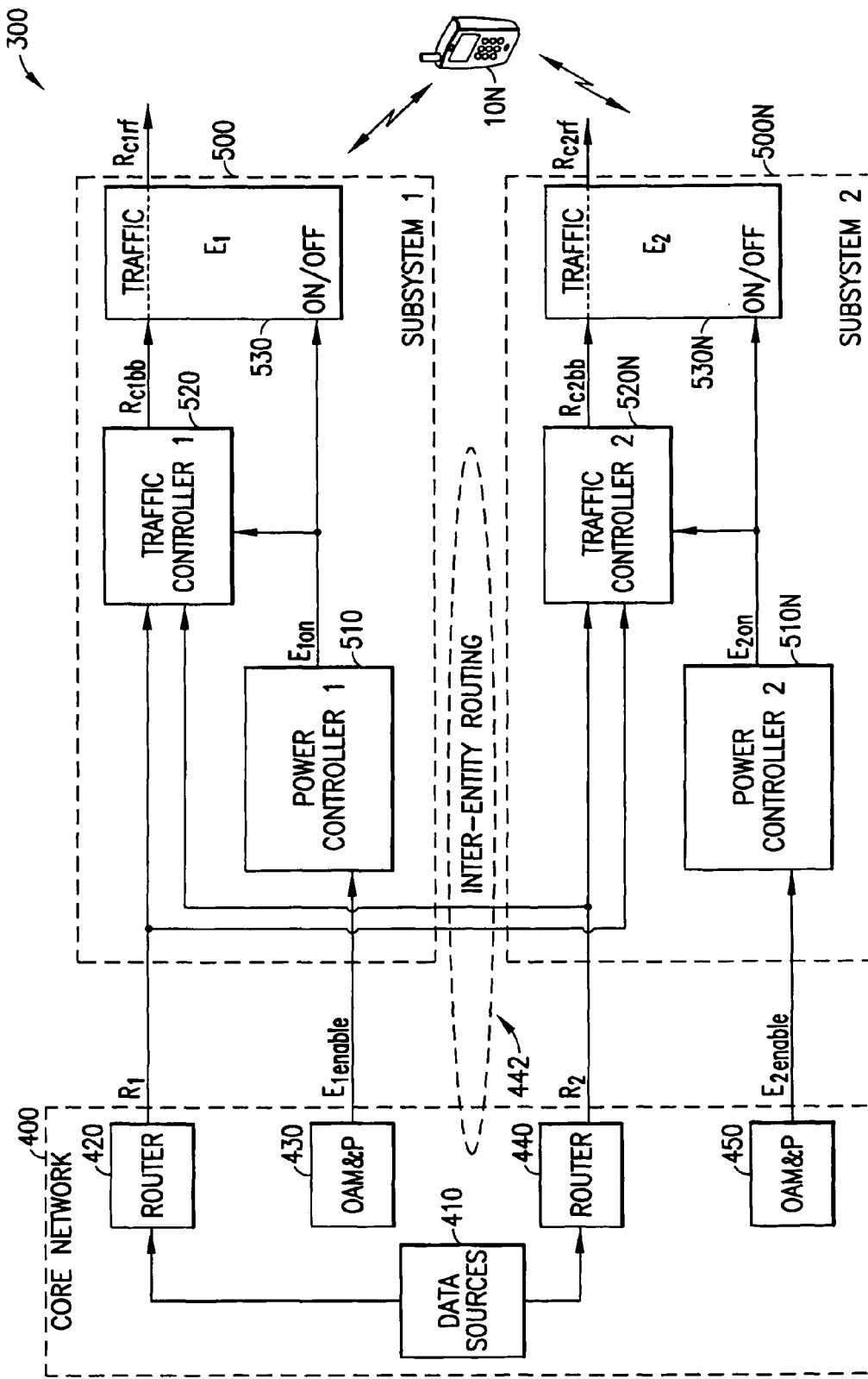
FIG. 4 is a conventional wireless communication system that comprises a core network and two subsystems.

FIG. 1 reproduces FIG. 4-1 of 3GPP TS 36.300 V8.12.0, and shows the overall architecture of a generic E-UTRAN system 2 (Rel-8). The E-UTRAN system 2 includes three eNBs; eNB 2, eNB 3 and eNB 4 which provides what is called the E-UTRAN user plane (PDCP/RLC/MAC/PHY) and the control plane (RRC) protocol terminations towards the UE (not shown). eNB 2, eNB 3 and eNB 4 are interconnected with each other by means of an X2 interface. The X2 "connection" shown in FIG. 1 is logical in nature. In other words, the architecture depicted in FIG. 1 is shown as a direct connection between eNodeB's, but in various implementations X2 connections may be physically routed through transport connections similar to the two S1 interface connections shown.

The S1 interface connects to an Evolved Packet Core (EPC) which is the IP-based core network defined by 3GPP in Rel-8 for use by LTE and other access technologies. Two EPCs, EPC 5 and EPC 6, are shown in FIG. 1 and consist of a Mobility Management Entity (MME), a Serving Gateway (S-GW) that interfaces with the E-UTRAN, and a Serving Gateway (S-GW) that interfaces to external packet data networks. The S-GW routes and forwards user data packets among other tasks as defined by 3GPP TS 23.401. The S1 interface supports a many-to-many relationship between MMEs/S-GWs and eNBs.

The eNB hosts the following functions:
functions for remote radio management/control (RRM and RRC), Radio Admission Control, Connection Mobility Control, Dynamic allocation of resources to UEs in both UL and DL (scheduling);
IP header compression and encryption of the user data stream;
selection of a MME at UE attachment;
routing of User Plane data towards the EPC (MME/S-GW);
scheduling and transmission of paging messages (originated from the MME);
scheduling and transmission of broadcast information (originated from the MME or O&M); and
a measurement and measurement reporting configuration for mobility and scheduling.

Additional reference is made to 3GPP TR 36.913, V8.0.1 (2009-03), 3GPP TSG RAN1 entitled "Requirements for Further Advancements for E-UTRA" (LTE-Advanced) (Release 8), incorporated by reference herein in its entirety. A goal of LTE-A is to provide significantly enhanced services by means of higher data rates and lower latency with reduced cost. LTE-A is directed toward extending and optimizing the 3GPP LTE Rel-8 radio access technologies to provide higher data rates at very low cost. LTE-A is part of LTE Rel-10. LTE-A is a more optimized radio system fulfilling the ITU-R requirements for IMT-A while maintaining backward compatibility with LTE Rel-8. Reference is further made to a Release 9 version of 3GPP TR 36.913, V9.0.0 (2009-12), incorporated by reference herein in its entirety. Reference is also made to a Release 10 version of 3GPP TR 36.913, V10.0.0 (2011-06), incorporated by reference herein in its entirety.

(b) Wireless Communication Coverage Areas

FIGS. 2A-2E are illustrations of the coverage areas in conventional wireless communication systems. The figures provide an illustration of a single user equipment (UE) 10 representative of multiple nearby UEs having the same number of radio paths that can connect the UE to a wireless network. The radio network is typically designed to provide multiple paths to a UE so that even with obstructions (e.g. building, hills) near the UE at least one connection is available. The result of the intentional overlapping coverage is that many UEs, those that are not obstructed, have multiple links available (i.e. FIG. 2E). For the UEs with multiple links available, the opportunity exists to turn off the power to the more than one link necessary for communication with the UE.

Figure 2A:
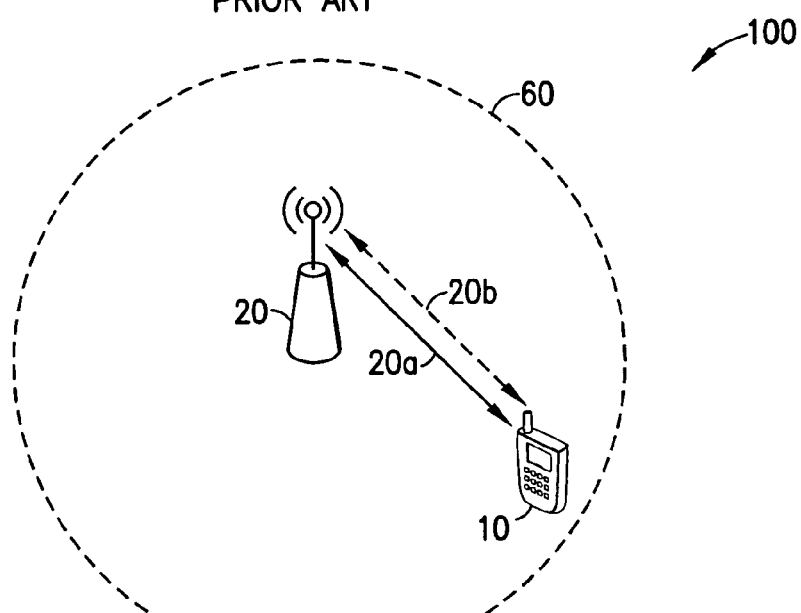
FIG. 2A is an illustration of a coverage of a sector of a macro base station in a wireless communication network as known in the prior art.
Figure 2B:
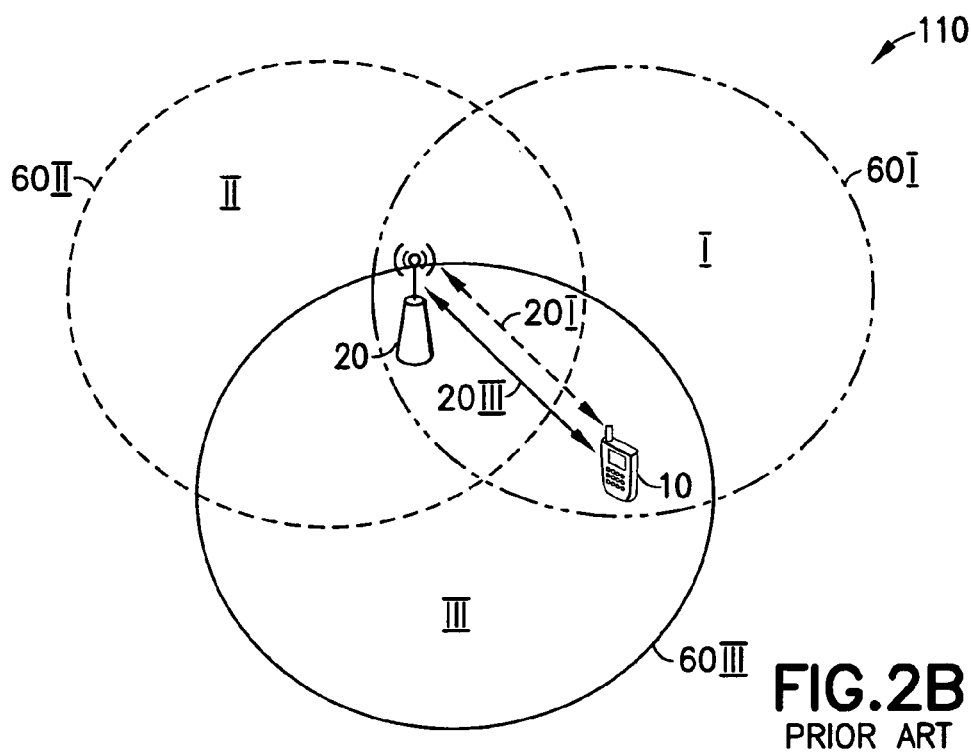
FIG. 2B depicts a base station coverage area with user equipment located in an individual cell as known in the prior art.

In FIG. 2A a typical wireless communication is depicted between a base station and user equipment as known in the prior art 100. As shown in FIG. 2A, user equipment (UE) 10 (e.g., a cellular phone, smart phone, personal computer or tablet) is connected to a base station (BS) 20 with communications coverage area 60 shown along two radio propagation paths, 20a and 20b, respectively. Each radio propagation path represents a radio channel assignment. As used throughout this document, a "channel" refers to a radio channel which is a physical layer term that refers to a signal at a radio frequency or within a band of radio frequencies (e.g. TV channel). Base stations are typically configured with multiple radio resources (e.g. transmitters) that each operate on a radio channel within a sector, or groups of channels within a sector. Control functions of a base station assign logical channels to radio channel resources based upon several factors. For a typical macro base station, the antenna pattern directs RF signals in a 120 degree sector resulting in a cardioid shaped coverage area as shown in FIG. 2A. Small coverage base stations often use an omni directional antenna that directs RF signal equally in all directions and resulting in a circular coverage area. BS 20 could be a conventional 3G radio base station (RBS), or a more evolved Node B (base station) (eNB) as described above and shown in FIG. 1. In other words, the base station can be from different radio technologies such as CDMA and/or LTE. Coverage area 60 of BS 20 is typically combined into three 120° areas, I, II, and III, as shown in FIG. 2B. Depending on the specific wireless base station deployed, a macro base stations can consume roughly 500-1000 Watts of input operating power to generate output radio frequency (RF) power of 20-40 Watts. In FIG. 2B, UE 10 is spatially located in area I and III of the coverage areas $60_I$, $60_{II}$ and $60_{III}$ of BS 20. Coverage area 60 can further be defined by delineating each sector into individual cells such as a single macro cell, two or more mirco cells, or a plurality of femto or pico cells, depending on the geographic area, known obstructions and population density. Furthermore, a heterogeneous, network can be designed in which a macro cell can contain two or more mirco cells, or a plurality of femto or pico cells.

For example, FIG. 2B depicts a base station coverage area with user equipment located in an individual cell 110, such as a macro cell. More specifically, FIG. 2B shows UE 10 located in sectors I and III of coverage $60_1$ and $60_{III}$ of BS 20. Also, three macro base stations can be deployed into three cell sites as shown in FIG. 2C, which shows user equipment located in an individual cell sector of a base station cell array 120. As shown in FIG. 2C, UE 10 is located in the coverage areas of cell site A, B, and C. UE 10 can communicate with base station A via path 20A, with base station B via path 20B and with base station C via path 20C. Here, each radio propagation paths represents a channel assignment selectively assigned by BS 20. Depending on the location of UE 10, each radio path may also represent radio coverage by more than one sector of a base station.

Figure 2D:
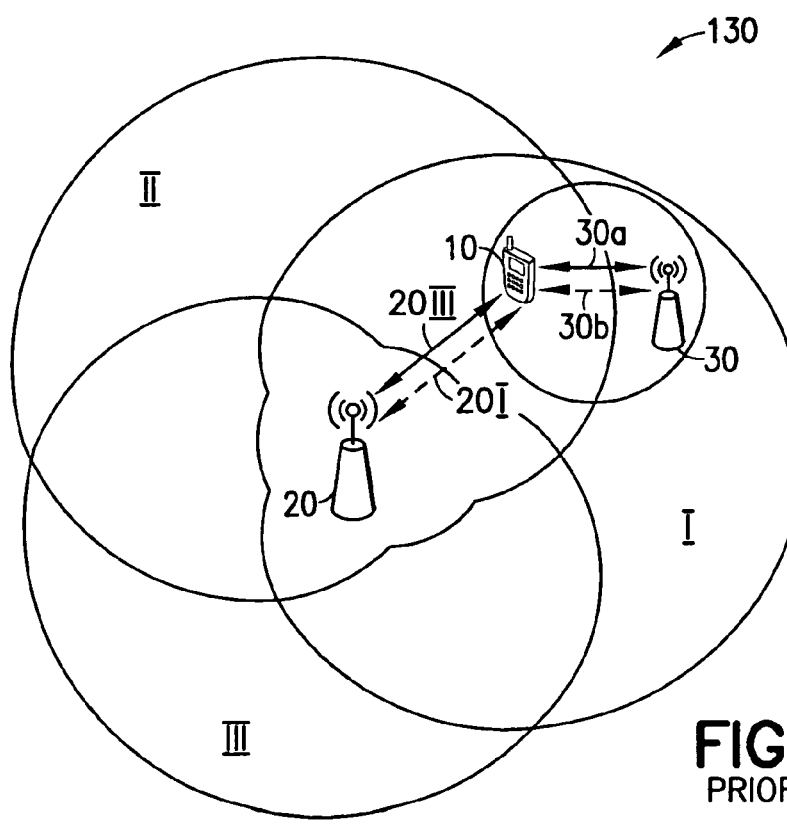
FIG. 2D depicts a user equipment with established communication with a femto or pico cell and with a macro cell as known in the prior art
Figure 2C:
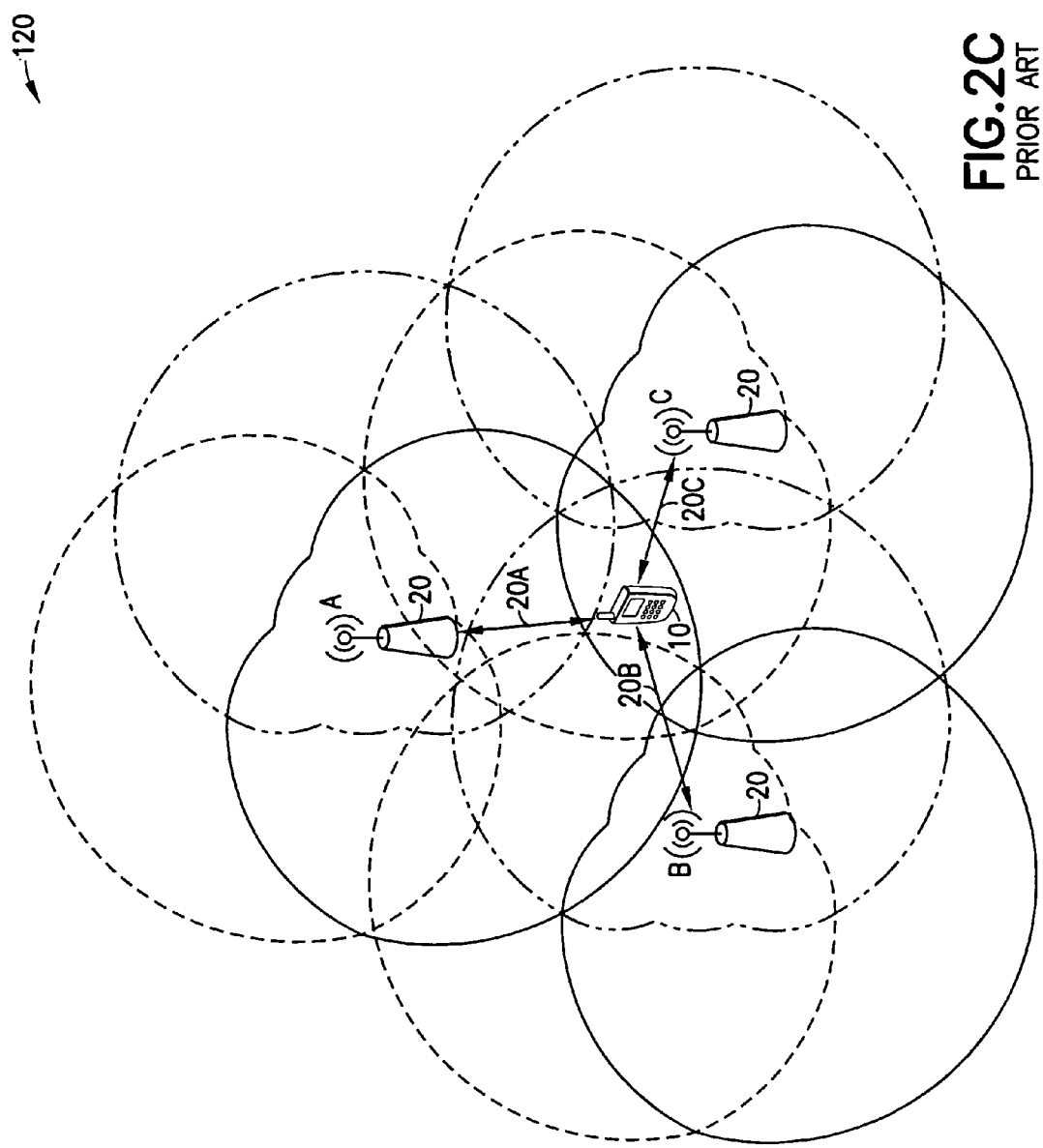
FIG. 2C depicts the coverage area of three base stations as known in the prior art

Another possibility for UE 10 is to establish communication with a small (e.g. femto or pico) cell area 130 (within overlapping radio coverage of macro cell base stations 20) as shown in FIG. 2D. In FIG. 2D, UE 10 has established communication with access point 30 along two radio propagation path, 30a and 30b, respectively, which represent radio channels available to the access point. A small cell access point typically has an omni directional antenna instead of the sector-based antenna used by a macro cell base station. FIG. 2D also shows that UE 10 is within the coverage areas of sectors I and II of base station 20. UE 10 can communication with BS 20 via radio paths $20_{II}$ and $20_I$. Each radio propagation path also represents a channel assignment selectively assigned by access point 30 and base station 20. A pico cell is typically a small cell which is designed by the network operator to enhance performance (e.g., designed to enhance coverage to areas which have poor reception). Such pico cells often are mounted at low elevations and operate at lower power than a macrocell. A femto cell is similar to a pico cell, however they are typically deployed as a Closed Subscriber Group (CSG) cell which is assessable only to a limited group of users.

Figure 2E:
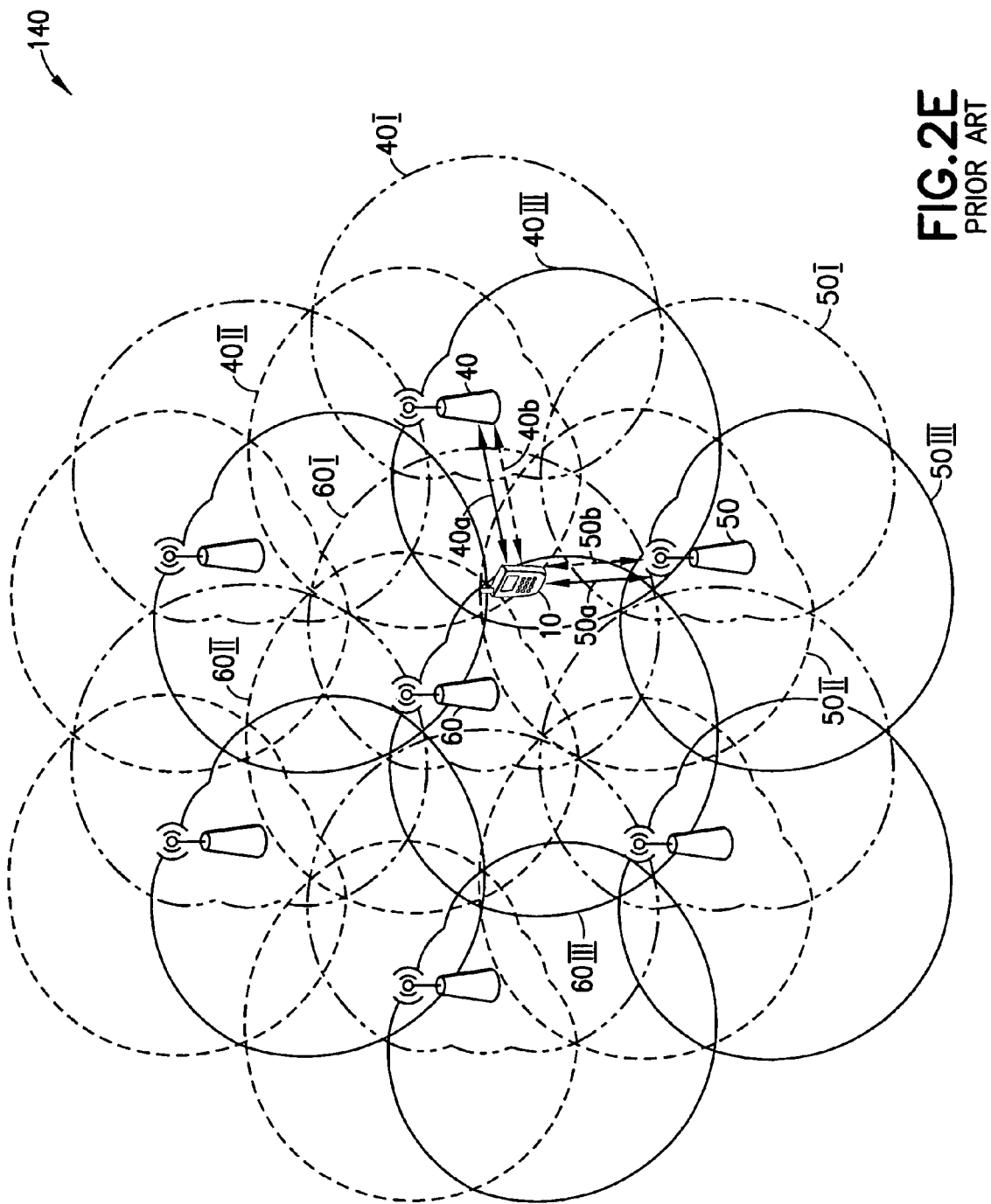
FIG. 2E depicts radio coverage between user equipment and several base stations.

Another possibility for UE 10 is to establish communication with other base stations as shown in FIG. 2E, which depicts seven base stations in a hexagonal array and with user equipment 10. In FIG. 2E, UE 10 has the option of establishing communication with BS 40 along two radio propagation paths, 40a and 40b, respectively. Note that UE 10 is located in region of coverage from two sectors of BS 40 with paths 40a and 40b representing both multiple sectors and multiple channels. Alternatively, UE 10 has the option of establishing communication with BS 50 along two radio propagation paths, 50a and 50b, respectively. Paths 50a and 50b also represent multiple sectors and multiple channels. As UE 10 moves about a coverage area 60, communication handoffs can occur, for example, moving in to coverage areas 60 of BS 60, or moving south into coverage area 50 of BS 50. Each base station can be maintained by a specific vendor based upon its specific region of coverage, or by a specific mobile operator based upon the operator's operating area.

(c) Traffic Re-Assignment in a Wireless Communication System

Figure 3:
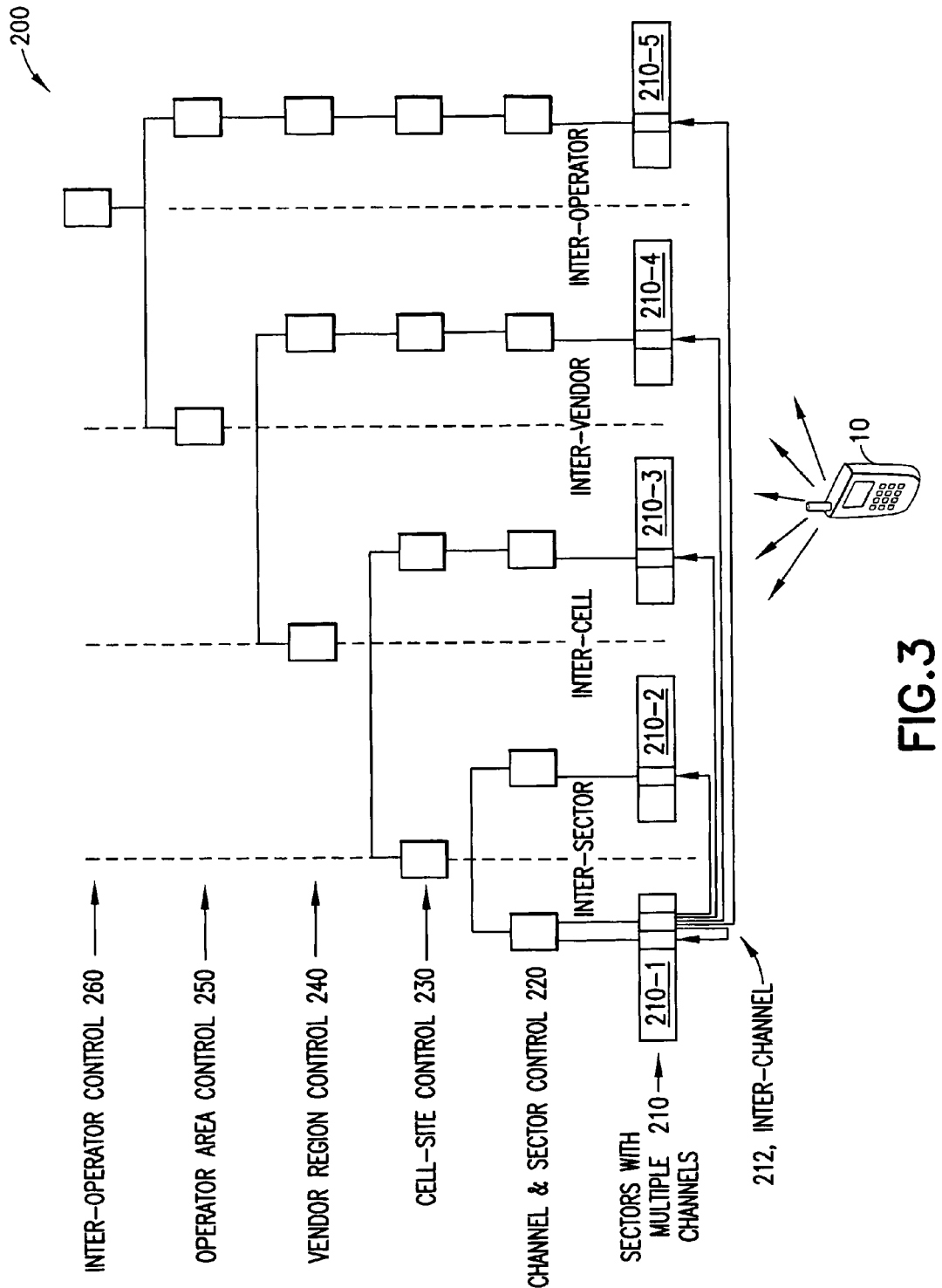
FIG. 3 is an illustration of a conventional traffic re-assignment system.

Referring now to FIG. 3, an illustration of a conventional traffic re-assignment system 200 is shown. In FIG. 3, a control function assigns traffic of a logical channel to various radio channels 212. The control functions can have scope of a sector 220, cell-site 230, vendor region 240, operator area 250, or inter-operator area (i.e. roaming) 260. As will be explained in more detail below, a base station sector controller can reassign traffic from one channel to another channel within a sector. The underlying premise of a traffic reassignment system is that UEs in a cellular system have multiple radio paths and that cellular systems have the ability to assign traffic to the various radio paths. Accordingly, an opportunity may exist to consolidate traffic on some resources so that resources with no traffic can be turn off to lower system-wide energy consumption. For example, a given scenario may call for channel assignment from one of the three sectors of a coverage area described above and shown in FIG. 2A. Another scenario may call for channel reassignment between cell sites (e.g., base station, as show in FIG. 2C, or between other resources located in femto or pico cells as shown in FIG. 2D. As such, channels reassignments 210-1, 210-2, 210-3, 210-4 and 210-5 are available for traffic management with inter-channel reassignment provided for various prior art methods of hand off.

Likewise, traffic within a group of channels can be reassigned from one group of channels to another group of channels. If the user equipment has an acceptable signal quality from two sectors, then a cell-site controller may chose to re-assign traffic from one sector to another sector. Continuing up the hierarchy, and if the mobile station is receiving acceptable signal from two cell sites, the controller that is common to both cell sites (which also is often within a base station vendor's deployment region) may decide to re-assign traffic from one cell to another cell. Within an operator area, the operator may decide to re-assign traffic between cell sites of two different vendors' equipment. Between operators, a roaming agreement may allow re-assignment of traffic between operators.

Exemplary embodiments of the present invention as described below provide novel techniques of controlling which resource (e.g., entity) to turn off, and which to turn on. As a condition of turning off a resource, the traffic from a resource may be re-assigned to another resource that can provide acceptable radio coverage to the mobile station. Also, exemplary embodiments of the present invention include a subsystem that contains a controller resource such as a channel, group of channels, sector, or cell site. Note that in this document, the turning off a resource is treated the same as placing the resource in a standby mode.

(d) Description of Various Exemplary Electronic Devices and Apparatus

Figure 5:
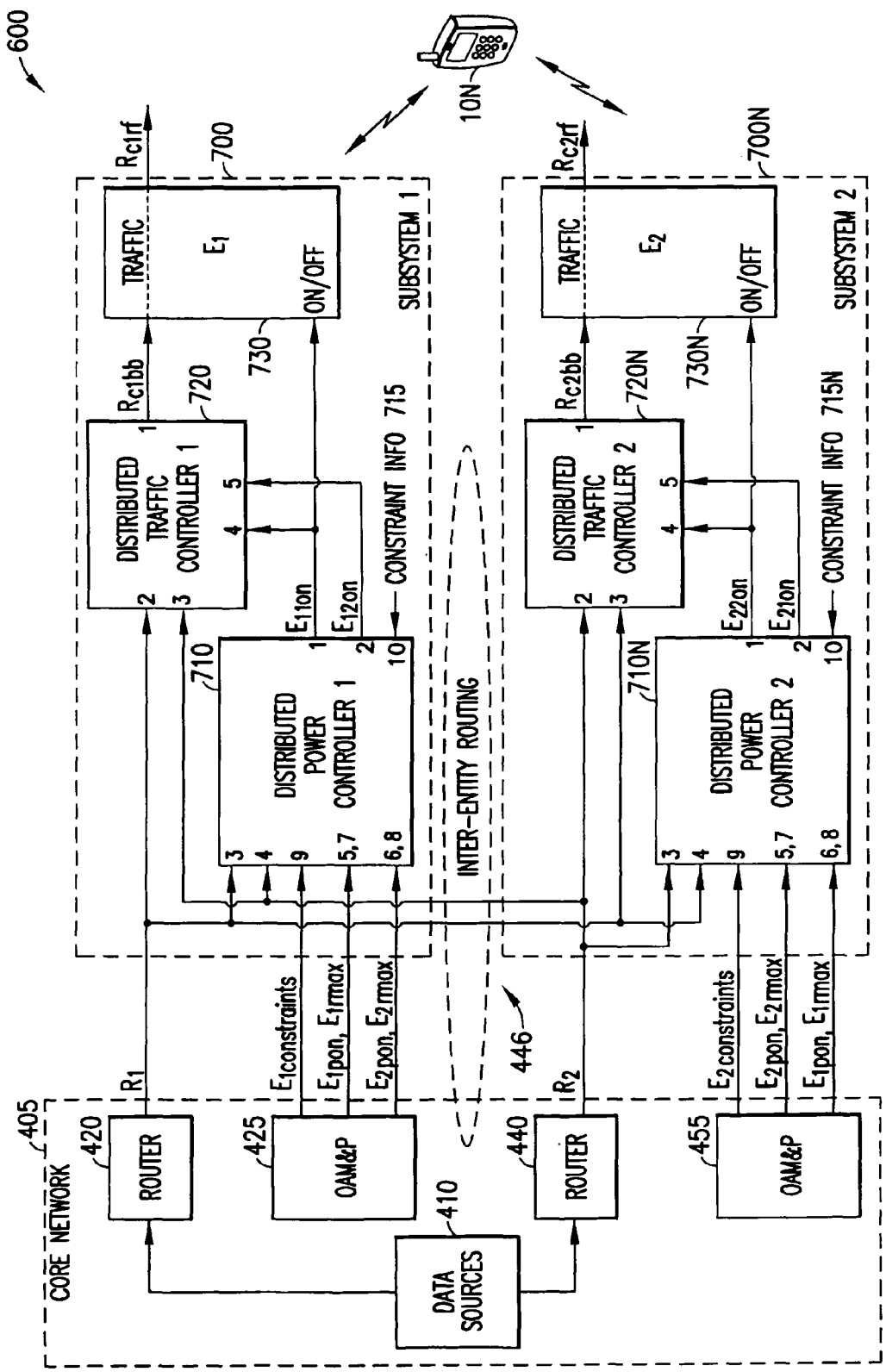
FIG. 5 is an illustration of a simplified block diagram of various exemplary electronic devices and apparatuses that are suitable for use in practicing the exemplary embodiments of this invention.

Before describing in further detail the exemplary embodiments of this invention, reference is made to FIG. 5 for illustrating a simplified block diagram of various exemplary electronic devices and apparatuses that are suitable for use in practicing the exemplary embodiments of this invention. However, prior to describing FIG. 5, reference is first made to FIG. 4 which illustrates an example of one or more a conventional base stations in a conventional wireless communication system 300. The conventional construction of such an apparatus is presented for explaining the subsequent figure, FIG. 5, as well as the exemplary embodiments of the methods and computer programs of the present document.

As shown in FIG. 4, a conventional wireless communication system 300 comprises a core network (CN) 400, and at least two subsystems such as subsystem 1 500 and subsystem 2 500N coupled to a plurality of user equipment UE 10N (e.g., cellular phone, smart phone, laptop computer, tablet). CN 400 includes a plurality data sources 410, at least one or more routers, such as a first router 420 and a second router 440, and at least one or more Operations, Administration, Maintenance, and Provisioning (OAM&P) controllers, such as OAM&P one 430 and OAM&P two 450.

First router 420 and second router 440 are configured to provide functions such as a mobile switching center or a packet data serving node in CN 400. First router 420 and second router 440 routes traffic between data sources 410 and UE 10N by way of subsystem 1 500 and subsystem 2 500N. As known by those skilled in the art, depending on the specific traffic route, a single router may suffice for both traffic routes (or bearers), $R_1$ and $R_2$. Inter-entity routing 442 denotes handoff or simulcast interfaces. Moreover, inter-entity routing 442 may be accomplished by various methods including hard handoff, in which case the inter-entity paths go through the core network, or by soft handoff, which normally involves direct inter-subsystem paths (e.g. X2 connection of FIG. 1) without going through the core-network. The bearer path, $R_1$ and $R_2$, represents both a bearer path and the rate of traffic on the bearer path. Bearer paths $R_1$ and $R_2$ are routed to the traffic controllers.

OAM&P one 430 and OAM&P two 450 are configured to enable ("power on") one or more power controlled entities such as a first power controlled entity ($E_1$) 530 and second power controlled entity ($E_2$) 530N. The OAM&P function may be a single centralized entity or multiple independent entities. As shown in FIG. 4, subsystem one 500 includes a first power controller 510 which is coupled to OAM&P 430 and a first traffic controller 520 and the first power controlled entity ($E_1$) 530. Subsystem two 500N similarly includes a second power controller 510N coupled to OAM&P 450, a second traffic controller 520N and the second power controlled entity ($E_2$) 530N. The power controlled entity is a radio resource such as a base station transmitter. For example, $E_1$ and $E_2$ as shown in FIG. 4, each receive an enable on signal ($E_{1on}$ and $E_{2on}$). Also, shown in FIG. 4, first traffic controller 520 and second traffic controller 520N route one or more traffic routes (or bearers) to $E_1$ and $E_2$, which, in turn, communicate the traffic to one or more UE 10N. In particular, the first traffic controller 520 receives a first traffic route $R_1$, then it outputs a first combined output baseband signal $R_{c1bb}$ to a first power controlled entity $E_1$ which then convert the output baseband signal $R_{c1bb}$, to a radio frequency signal $R_{c1rf}$ that is wirelessly transmitted to one or more UE 10N. If inter-entity routing 442 is routing traffic $R_2$ to subsystem 1 500, Rc1bb is a combination of traffic routes $R_1$ and $R_2$. A similar traffic routing technique is employed in subsystem 2, where second traffic controller 520N receives a second traffic route $R_2$, then outputs a second combined output baseband signal $R_{c2bb}$ to a second power controlled entity $E_2$ which then convert the output baseband signal $R_{c2bb}$, to a radio frequency signal $R_{c2rf}$ that is wirelessly transmitted to one or more UE 10N. If inter-entity routing 442 is routing traffic $R_1$ to subsystem 2 500N, Rc2bb is a combination of traffic routes $R_1$ and $R_2$.

In the conventional traffic routing technique described above and shown in FIG. 4, the power controllers and traffic controllers are relatively independent, which would be the case if the entities are, for example, in different base stations. Basically, the conventional traffic routing technique provided as follows: (1) the first and second power controllers 510/520N turn on the first and second power controlled entities $E_1$ and $E_2$; and (2) each receive routed traffic, $R_1$ and $R_2$ from first and second traffic controllers 520/520N, where each having data rates $R_1$ and $R_2$ to the controlled entities. Each traffic controller may include buffering (not shown) to accommodate the situation in which the traffic exceeds the capacity of a power controlled entity. Accordingly, the conventional traffic routing model provides that the subsystems are configured to balance the traffic load, meaning that a handoff or a simulcast is used to make $R_{c1bb}$ and $R_{c2bb}$ approximately equal. As such, the first and second power controlled entities, $E_1$ and $E_2$, are always powered on. As will be described shortly, the present invention provides a traffic control system which provides an imbalance between $R_{c1bb}$ and $R_{c2bb}$, such that one of the entities carries all of the load and the other entity carried none of the load. As such, the non-load carrying entity is then turned off, or placed in standby, so that it consumes little or no power.

Prior art energy savings systems generally exchange signals (such as via FIG. 1 X2) to instruct one system to turn on or off their controlled entity. The exchange typically happens after one of the independent power controllers 510/510N decide to turn on or off the power to their local controlled entity. This decision is typically made based on information within the local subsystem and is made without knowledge such as traffic load, traffic capacity, power consumption or the sister subsystem. Without knowledge of the sister controller information it is difficult to make an energy savings decision that is optimum for both subsystems. As mentioned above, one of the FIG. 4 controllers normally makes a decision and then informs the other, which sets up a master and slave (server and client, superior and inferior) situation which normally requires that one subsystem be pre-designated as a master and the other designated as a slave. However, a peer to peer relationship between subsystems is preferred because, from a radio coverage perspective with the UE 10, each path is a peer and it's difficult to know at any point in time which path is superior or inferior. In addition with prior art energy savings systems, there is typically a subsequent exchange of messages until the respective controllers agree on a course of action and then simultaneously execute turn on or off of the controlled entities. The described exchange of information can result in substantial delay from the time of the power on or off decision is made to the actual simultaneous execution of turning on or off of the power controlled entities. During the delay period, the traffic rates, $R_1$ and $R_2$, can continue to change, which can sometime result in turning off of an entity at a time when traffic rate has increased and the entity should have instead been turned on.

Turning now to FIG. 5, a detail description of the exemplary embodiments of this invention is provided. FIG. 5 is an illustration of a simplified block diagram of various exemplary electronic devices and apparatuses 600 that are suitable for use in practicing the exemplary embodiments of this invention. In particular, FIG. 5 discloses a system for routing traffic, $R_1$ and $R_2$, from a core network (CN) 405 to a plurality of UE 10N via two subsystems (e.g., access networks) in a manner in which the power consumed by first and second power controlled entities, $E_1$ and $E_2$, can be minimized. CN 405 of FIG. 5 contains some components which perform similar functions as described above in FIG. 4. However, the first and second and at least one or more Operations, Administration, Maintenance, and Provisioning (OAM&P) controllers 425 and 455 are configured to provide more information to the subsystems than controllers 430 and 450 of FIG. 4.

The first and second subsystems 700/700N of FIG. 5 include a first and second distributed power controller (DPC) 710/710N and a first and second distributed traffic controller (DTC) 720/720N as opposed to non-distributed (i.e. independent) versions of these controllers shown in FIG. 4. For the purposes of simplicity in this document, the following descriptions of the distributed power controller and distributed traffic control (as well as the methods and computer programs of the same that follow) will be provided by way of an example which includes two subsystems. The present invention is not limited to an apparatus which include only two subsystems as shown in the example of an exemplary embodiment of the present invention in FIG. 5. On the contrary, an unlimited number of subsystems can be combined to carry out the various embodiments of the present invention as known by those skilled in the art.

The bearer path, $R_1$ and $R_2$, represents both a bearer path and the rate of traffic on the bearer path. Bearer paths $R_1$ and $R_2$ are routed to the distributed power controllers so that the distributed power controllers can determine whether the traffic rates, or combination thereof, are within the capacity of the controlled entities. Exemplary embodiments of the present invention provide several methods for determining the traffic rate are available. These include, but are not limited to, a separate rate signal from the router to the DPC, a actual bearer path from the router to the distributed power controller to the DPC, or a prediction of the traffic rate that is expected on the bearer path (as shown in FIG. 5).

(i) Distributed Power Controllers

As can be seen in FIG. 5, the first and second DPCs 710/710N receive additional (and identical) OAM&P information, bearer path traffic rates (from both subsystems), and constraint information in contrast to conventional first and second power controllers 510/510N shown in FIG. 4. That is, the distributed power controllers of the present invention not only outputs the power on/off signal (e.g. $E_{11on}$ or $E_{22on}$) for the power controller entity within the subsystem (as did the power control of FIG. 4), but in addition, first and second DPCs 710/710N also outputs a copy of the power on/off signal (e.g. $E_{12on}$ or $E_{21on}$) of the other subsystem to the first or second DTC 720/720N. For example, first DPC 710 outputs its own enable signal power $E_{11on}$ plus the copy of the output signal $E_{12on}$ of second DPC 710N which in this example is an enable on $E_{22on}$. Likewise, the second DPC 710N outputs its own enable signal power $E_{22on}$ plus the copy of the $E_{21on}$ output signal of the first DPC 710 which in this example is an enable on $E_{11on}$.

The first and second DPCs 710/710N are coupled to power controlled entities $E_1$ and $E_2$, respectively. The controlled entities may be, for example, transmitter chains that convert the base band signal to radio frequency (RF) signal. The controlled entities receive signals (e.g. $E_{11on}$ or $E_{22on}$) that indicate whether they turn on or turn off the controlled entity. Each subsystem outputs combined radio frequency (RF) traffic, $R_{c1rf}$ and $R_{c2rf}$ that may be traffic $R_1$, $R_2$, or combined traffic $R_1+R_2$. Each subsystem may route their respective traffic (e.g. $R_1$ or $R_2$), or may combine the traffic to create $R_1+R_2$.

As noted above, the first and second DPCs 710/710N receive information regarding the power consumptions of first and second 730/730N (e.g. enable on signal $E_{1pon}$ or $E_{2pon}$) from the first and second OAM&P 425/425N. Given the power consumptions information and other choices equal, the DPCs can choose to turn off the higher power entity as a mean to minimize the energy consumption. Also, the first and second DPCs 710/710N receive information regarding traffic capacities of each power controlled entity ($E_{1rmax}$ or $E_{2rmax}$).

Furthermore, the first and second DPCs 710/710N receives from the first and second OAM&P 425/425N, respectively, identical operational constraints, $E_{1constraints}$ and $E_{2constraints}$, which include additional constraint information regarding each power controlled entity such as whether energy savings (ES) mode is enabled, as well as the enable on of both power controlled entity ($E_{1enable}$ $E_{2enable}$) as in FIG. 4. Moreover, the first and second DPCs 710/710N (and the first and second DTCs 720/720N) receive both traffic rates, $R_1$ and $R_2$ from the first router 420 and second router 455. First and second DPCs 710/710N also obtain identical local constraint information 715/715N regarding each entity coupled to subsystem 1 700 and subsystem 2 700N.

Accordingly, based upon the above described inputs, the distributed power controllers determine which power controlled entity to turn on and which power controlled entity to turn off. As can be appreciated from the above description and FIG. 5, the first DPC 710 of subsystem 1 700 and the second DPC 710N of subsystem 2 700N are supplied the same information. Hence, both the first DPC 710 and second DPC 710N can employ the same algorithm because they both receive the same information. Accordingly, because the same information is sent to each subsystem, the outputs of the distributed power controllers are the same and the control decisions are considered to be distributed across both subsystems. As will be described more fully below, one possible embodiment of the present invention exploits this novel feature of the above described apparatus which provides identical information to one or more subsystems and then employs identical algorithms in those same subsystems (e.g., to control the distributed power controllers). The identical information and identical algorithms are two of the enablers for the peer-to-peer relationship.

Given identical information and identical algorithms, both distributed power controllers make the same decision and know the decision that the other distributed power made. As explained above, the first DPC 710 determines whether the first power controlled entity $E_1$ will be turned on by outputting $E_{11on}$. In addition, the first DPC 710 also will indicate whether the second DPC 710N will turn on the second power control entity $E_2$ by outputting $E_{12on}$. Likewise, the second DPC 710N will determine whether the second power controlled entity $E_2$ will be turned one by outputting $E_{22on}$ and will indicate whether the first DPC 710 will turn on the first power controlled entity $E_1$ by outputting $E_{21on}$. Therefore, if both distributed power controllers are operational as described above, the state of $E_{11on}$ should equal $E_{21on}$ and the state of $E_{22on}$ should equal $E_{12on}$. Because both distributed power controllers make the same decision and know the result that the sister controller will make, there is no need to communicate the distributed power controller results between the subsystems for the purpose of informing a sister controller to turn on or off their respective controlled entity. There may, however, be a benefit for exchanging DPC output signals ($E_{11on}$, $E_{12on}$, $E_{21on}$ and $E_{22on}$) between subsystems 700/700N for the purpose of error checking to assure that both DPCs 710/710N made the same decision. It is desirable, in order to support a peer-to-peer relationship and to facilitate implementation of the subsequent algorithms, to maintain the order of inputs and outputs of the distributed power and distributed traffic controllers to allow the controllers to be implemented with identical algorithms. The specific pinout shown in FIG. 5 are but one of many non-limiting examples of how to configure the distributed power controller and distributed traffic controller according to exemplary embodiments of the present invention. The order of the inputs and outputs allows use of the same algorithm (e.g., software subroutine), in both distributed controllers to produce identical results without having to differentiate whether the algorithm is in subsystem one 700 or subsystem two 700N. For further clarification, a non-limiting example of software calls, using the notation [outputs]=function (inputs), to the distributed power controller (DPC) and distributed traffic controller (DTC) follow:

```
1 %subsystem 1
2 [e11on(i+1),e12on(i+1)] = dpc(r1(i),r2(i),e1pon,e2pon,e1rmax,e2rmax);
3 [rc1(i+1)] = dtc(r1q(i),r2q(i),e11on(i),e12on(i));
4
5 %subsystem 2
6 [e22on(i+1),e21on(i+1)] = dpc(r2(i),r1(i),e2pon,e1pon,e2rmax,e1rmax);
7 [rc2(i+1)] = dtc(r2q(i),r1q(i),e22on(i),e21on(i));
```

The distributed power controller function call of subsystem 1, line 2 is the same as the call for subsystem 2, line 6 with pair-wise inputs and outputs reversed. Likewise, the distributed traffic controller call for subsystem 1, line 3 and subsystem 2, line 7 are the same except that the input pairs (e.g. $E_{11on}$, $E_{12on}$) are reversed.

Referring to the pinouts (i.e. the order of terms in the sub-routine calls) shown in FIG. 5 and the above code, it follows the first DPC 710 receives $R_1$ the first bearer path input at port, 3, and receives $R_2$ on the $2^{nd}$ bearer path input port 4. Likewise, the second DPC 710N receives $R_2$ on the $1^{st}$ input port 3, and receives $R_1$ on the $2^{nd}$ input bearer port 4. Also, the first DPC 710 receives $E_{1pon}$ and $E_{1rmax}$ signals on the first OAM&P ports 5 and 7, and receives the similar parameters regarding the $2^{nd}$ subsystem 700N on the $2^{nd}$ OAM&P port 6 and 8. Likewise, the second DPC 710N receives $E_{2pon}$ and $E_{2rmax}$ on the first OAM&P interface 5 and 7 and received $E_{1pon}$ and $E_{1rmax}$ on the $2^{nd}$ OAM&P interface 6 and 8. The first DPC 710 outputs a signal, $E_{11on}$, to indicate whether or not to turn on $E_1$. If $E_{11on}$ is true, then $E_1$ is turned on. If $E_{11on}$ is not true, then $E_1$ is turned off, which reduces energy consumption. Likewise, the first DPC 710 output $E_{12on}$, which is a duplicate of the decision that the second DPC 710N makes regarding $E_{22on}$. The second DPC 710N outputs a signal, $E_{22on}$, indicating whether to turn on or off $E_2$. The second DPC 710N also outputs $E_{21on}$, which as a duplicate of the decision that the first DPC 710 makes regarding $E_{11on}$.

As mentioned above, because both power controllers produce identical results regarding both the local power-on decision and the remote power-on decision, there is no need to communicate the remote power-on decision between the distributed power controllers. Accordingly, the lack of post-decision signaling makes implementation simpler than solutions that require controllers to exchange results after making the power on or off decisions.

(ii) Distributed Traffic Controllers

Referring again to FIG. 5, an exemplary example of a distributed traffic controller will now be described. Reference will be made to specific pinout shown in FIG. 5. However, those specific pinouts are only one of many non-limiting example of how to configure the distributed power controller and distributed traffic controller according to exemplary embodiments of the present invention. As such, FIG. 5 is merely provided as one example of many of how to configure a distributed traffic controller according to exemplary embodiments of the present invention. As shown in FIG. 5, the first and second DTCs 720/720N route $R_1$, $R_2$, or $R_1+R_2$ to the power controlled entity based on the state of a pair of signals from the distributed power controller (e.g. $E_{11on}$ and $E_{12on}$). The first DTC 720 receives the local power controller decision, $E_{11on}$, on the traffic control port 4, and receives the copy of the result of the $2^{nd}$ subsystem 700N, $E_{12on}$, on the $2^{nd}$ traffic control port 5. The first DTC 720 receives $R_1$ on the first bearer input port 2, and receives $R_2$ on the $2^{nd}$ bearer port 3. Likewise, the second DTC 720N receives the local power controller decision, $E_{22on}$, on the traffic control port 4, and receives the copy of the result of the 1st subsystem 700, $E_{21on}$, on the $2^{nd}$ traffic control port 5. The second DTC 720N, receives the local bearer, $R_2$, on the first bearer port 2, and receives the remote bearer path on the $2^{nd}$ bearer port 4.

Turning now to the outputs of the distributed traffic controller, the first DTC 720 outputs $R_{c1bb}$, which is a base band bearer path that, depending on $E_{11on}$ and $E_{12on}$, may be traffic having rate $R_1$, $R_2$, or $R_1+R_2$. Likewise, the second DTC 720N outputs $R_{c2bb}$, which is a base band bearer path that, depending on $E_{22on}$ and $E_{21on}$, may be traffic having rate $R_1$, $R_2$, or $R_1+R_2$.

In operation, each distributed power controller receives an entity enable indication as one of the constraints from the system OAM&P function. With this and other information each distributed power controller decides whether to turn on the controlled entity coupled to the subsystem. Provided that the distributed power controller has turned on the controlled entity, the distributed traffic controllers route traffic, $R_1$ and $R_2$, each having data rates $R_1$ and $R_2$ to the controlled entities and may include buffering (not shown).

Like the distributed power controller described above, the first DTC 720 of subsystem 1 700, uses the same algorithm as the second DTC 720N of subsystem 2 700N. As such, the traffic routing decision is considered to be distributed across both traffic controllers in accordance with a peer-to-peer model.

In order to support a peer-to-peer relationship and to facilitate implementation of the subsequent algorithms, a desirable aspect of the present document is the ability for identical controllers of each subsystem to produce the same results. In order to assure the same results, at least one exemplary embodiment of the present invention employs identical software subroutines. One method of using the same software routines is to order the inputs and outputs of the subroutine calls and, within the subroutines, use variables denoted as local (L) and remote (R) relative to the respective subsystem. The software within the subroutines can (as one possible non-limiting example) use the following functional definitions:

```
function [elon,eron] = dpc(rl, rr, elpon, erpon, elrmax, errmax)
function [rc] = dtc(rlq, rrq, elon, eron)
```

For example, $R_{local}$ (rl) designates the local traffic rate and $R_{remote}$ (rr) designates the remote traffic rate. When, for example, the subroutine is called from subsystem 1, $R_1$ is connected to $R_{local}$ and $R_2$ is connected to $R_{remote}$. When the subroutine is called from subsystem 2, $R_2$ is connected to $R_{local}$ and $R_1$ is connected to $R_{remote}$.

FIG. 5 also shows a handoff link 446 between the access networks. The handoff links 446 can employ any known handoff techniques such as handoff methods that include hard handoff via the core network, soft handoff with direct inter-access network links, or simulcast where both R1 and R2 are routed to both subsystem 1 and subsystem 2 simultaneously. In one exemplary embodiment of the present invention, no additional inter-entity signaling is required along the handoff links 446 relative to FIG. 4 for the purpose of directing and coordinating the power on and off decision to the controlled entities, but does have additional signaling within each subsystem. The subsystems can act (e.g. initiate handoff and turn on or off the respective power controlled entities) immediately on the decisions of the distributed power controllers, without having to wait for inter-entity power controller signaling and subsequent inter-entity negotiation to complete as would be required for the subsystems of FIG. 4. The ability to act immediately on the power controller decision simplifies and enhances practical implementation of several of the embodiments of the present invention.

As described above, in order to minimize energy consumption, it is desirable to determine whether the equipment to be turned on and/or off is underutilized. For example, it is desirable to determine whether the traffic load (e.g. traffic having rate $R_1$) is far below the traffic capacity of the controlled entity. If so, the controlled entity is a candidate to either be turned off or to receive additional load (e.g. the traffic having rate $R_2$). Referring again to FIG. 3, a traffic management system employing exemplary embodiments of the present invention, such as the distributed power and traffic controllers, can consolidate traffic on one the subsystem and offload traffic from the other subsystem. The controllers of FIG. 3, consolidate of traffic to subsystems at the same level of control. For example, a channel and sector controller 220 can consolidate traffic between channel sized subsystems 212 210-1 within a sector. A cell-site controller 230 can consolidate traffic sector sized subsystems by moving traffic to adjacent sectors 212-1 212-2 within the cell. A vendor sized controller 240 can consolidate a geographic region sized collection of base stations by moving traffic to subsystems of sectors 210-2 210-3 of other base stations. An operator area sized controller 250 can consolidate traffic by moving traffic between subsystems of sectors 210-3 210-4 base stations in different vendor regions. An inter-operator regions can have control 260 that can consolidate traffic between sectors 210-4 210-5 of base stations operated by different operators. Various methods and computer programs will now be described which carry out signaling and control various resources so as to turn on and off equipment in a way that maintains services with minimum resources.

(e) Description of Various Exemplary Methods and Computer Programs

Figure 6:
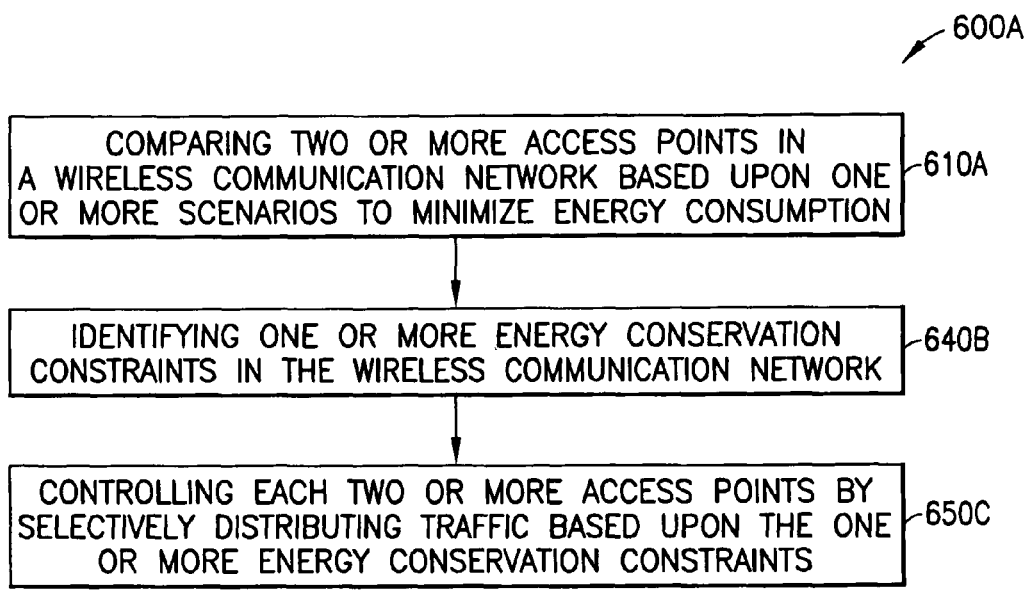
FIG. 6 depicts a logical flow diagram of various exemplary methods and computer programs that are suitable for use in practicing the exemplary embodiments of this invention.

FIG. 6 depicts one possible embodiment of the present invention which minimizes energy consumption in a wireless communication network by distributing or consolidating traffic loads among a plurality of equivalent access points (e.g. channel, sector, or base station) based upon one or more criterion 600A. A method comprises comparing input information into two or more access points in a wireless communication network based upon one or more scenarios to minimize energy consumption (610A), identifying one or more energy conservation constraints in the wireless communication network (640B), and controlling each of two or more access points by selectively distributing or consolidation traffic based upon the one or more energy conservation constraints (650C).

The method in one possible embodiment of the invention provides that a distributed power controller determines whether to enable or disable one or more access points. In another embodiment, the method provides that the distributed power controller powers off one or more access points based upon such non-limiting example of at least a traffic load, a traffic capacity, access point power consumption when the access point is turned on (equivalent to energy savings when the access point is turned off), or one or more operational constraints. The one or more operational constraints comprises, for example, a minimum quality of service, a time of day, a calendar date, and a probability of traffic routing failure.

In yet another embodiment, the method provides a distributed traffic controller route traffic to one or more enabled access points. In one or more embodiments, the method provides a radio resource (e.g. transmitter for a channel) with traffic to transmit to the UE 10. The distributed traffic controller determines which one of two or more access points to utilize to process traffic based upon the state information.

In yet another embodiment, the method provides that the distributed traffic controller routes traffic to any one of the one or more access point that are enabled, and clears traffic (e.g. terminates a connection, closes a call) based on the operational constraints.

In one or more embodiments, the method provides that traffic routing further comprises, handing off traffic to a remote wireless communication network or simulcasting to the remote wireless communication network.

The one or more access points can (as non-limiting examples) act as a transmitter of a channel of a sector of a wireless communication base station, a transmitter of a group of channels of a sector of a wireless communication base station, a sector of a wireless communication base station, or a wireless communications base station. The method also provides that one or more access points are not required to exchange controller results to acquire the state information.

(i) Distributed Power Control

Figures 7, 7B:
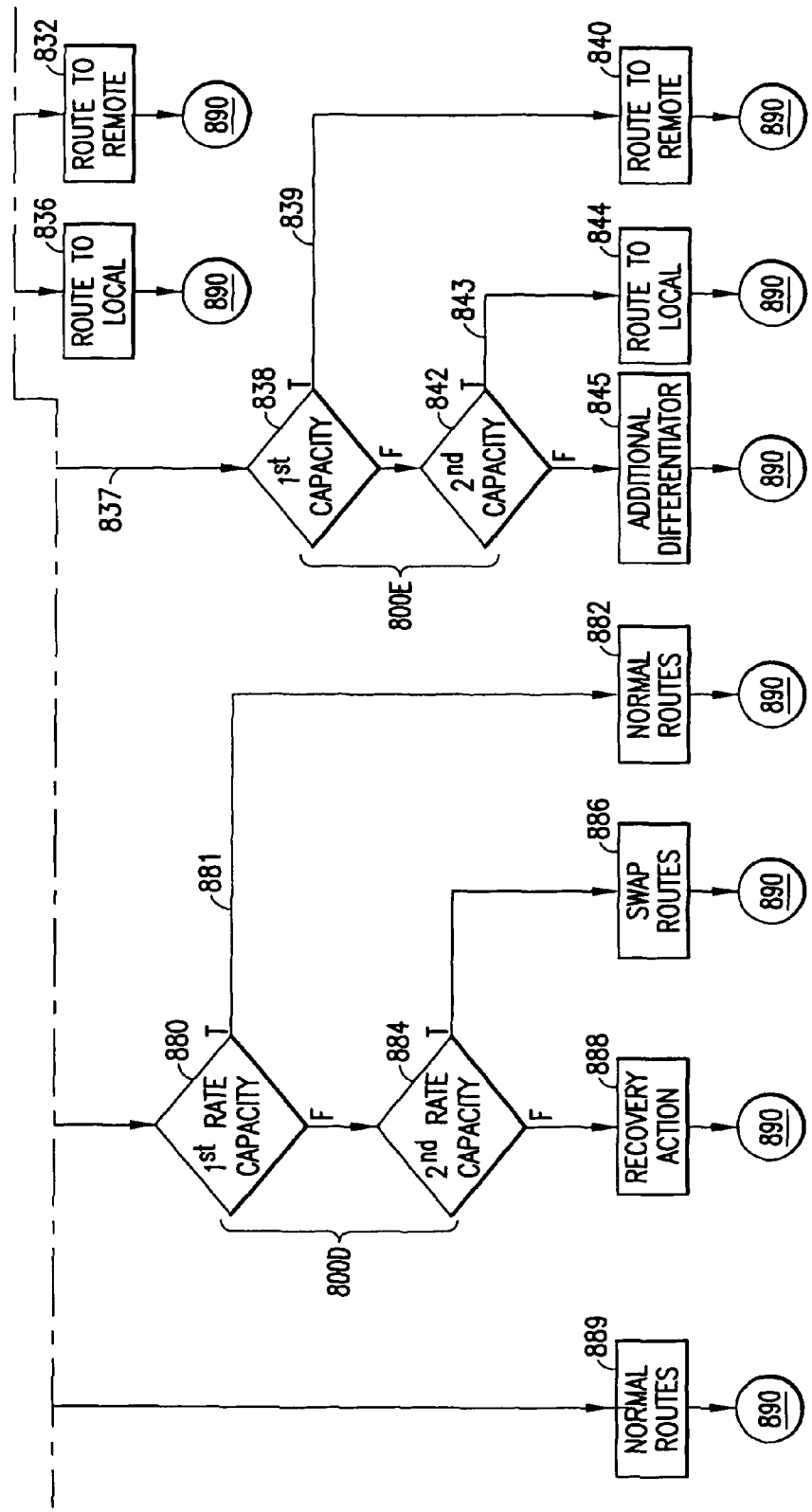
FIGS. 7A and 7B show a non-limiting example of a power control algorithm suitable for carrying out one or more embodiments of this invention.
Figure 7A:
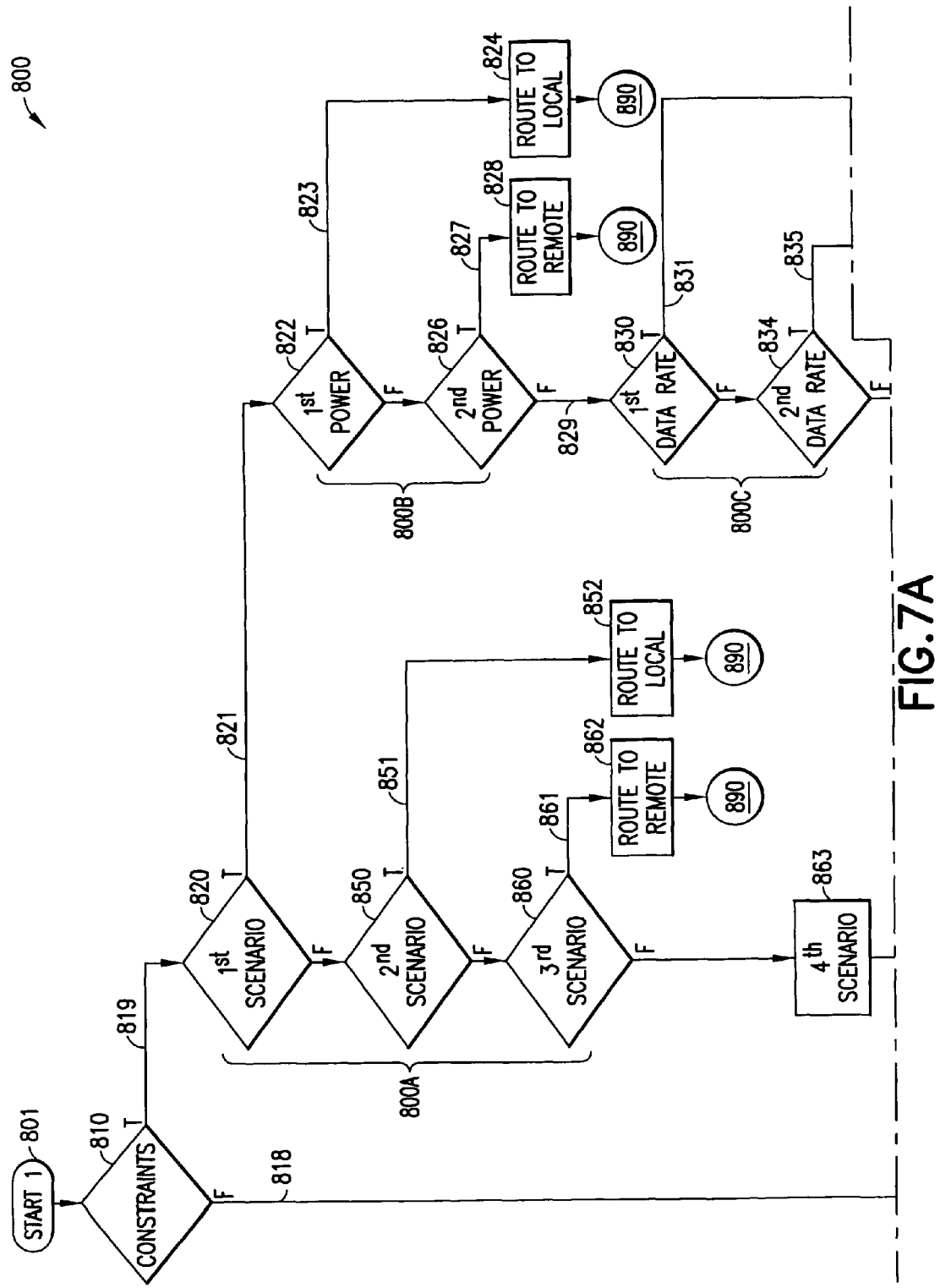

Referring now to FIGS. 7A and 7B, a non-limiting example of a power control algorithm 800 suitable for carrying out one or more embodiments of the present invention is shown. FIGS. 7A and 7B collectively are referred to herein as FIG. 7. The power control algorithm 800 shown in FIG. 7 may represent steps in a method and/or sections of code in the computer program. The illustration of a particular order to the blocks does not necessarily imply that there is a required or preferred order for the blocks and the order and arrangement of the blocks may be varied. Furthermore, it may be possible for some blocks to be omitted.

It is desirable in one possible embodiment of the present invention that distributed power controllers (e.g., 710/710N in FIG. 5) start 801 and execute synchronously (e.g. at the same controller sample time) under the following two pre-conditions: (1) each distributed power controller makes the same decision given the same values for each pair of inputs (e.g. $E_{1pon}$ and $E_{2pon}$) and (2) each distributed power controllers receives at least one pair of inputs in which the value for subsystem 1 is different than the value for subsystem 2. Based upon receipt of a difference in a pair of inputs, the distributed power controllers can then make a decision at the same time to turn on (or enable) an output and turn off (or enable) another output. Alternatively, if the distributed power controllers receive the same values for each pair of inputs, there is no basis to choose power down of one or the other entity, and the distributed power controllers can default to non-energy savings mode by turning on both power controlled entities.

It is understood that bearer traffic on real systems often cycles over a 24 hour period, and, in one embodiment that tracks such traffic cycles, the controllers sample the inputs and make determinations at a relatively slow rate (e.g. every hour). As another embodiment, the controllers sample inputs at a fast rate (e.g. every 100 msec), which allows the power constraint mode to closely track short-term changes in traffic rates.

With the above pre-conditions, the power control algorithm 800, first determines whether an entity meets one or more operational constraints (810). If the operational constraints are satisfied, then the entity is deemed to support a power constraint (PC) mode (819). PC mode is also know in the art as energy savings (ES) mode. Accordingly, the entity can participate in the power control algorithm 800. On the other hand, if the entity fails to satisfy one or more operational constraints, the entity will be required to employ various legacy non-energy savings modes (818) (e.g., the power control algorithm 800 cannot be employed). Thereafter, should an entity want to participate (after complying with the constraints 811), another attempt to participate in power control algorithm 800 can be made (890), when the distributed power control algorithm begins again at start 1 (801). This method step or computer executed procedure can be defined by a mobile operator network administrator or other vendor and can be varied depending on the entities and the overall system-wide power constraint goals. FIG. 8 provides an illustration of a decision tree 810 depicting a non-limiting example of the decision block 810 in FIG. 7 (e.g., whether several operational constraints are met). Initially, a first constraint determination can be made (811). For example, it might be determined whether both controlled entities are enabled or disabled (e.g. powered on/off). If an entity is powered off, neither subsystem can participate in power control algorithm 800. On the other hand, if true for both subsystems, then a second constraint decision can be made (812). One possible constraint decision could determine whether or not power constraint (PC) mode is enabled for both entities. If PC mode is not enabled for both subsystems, neither entity cannot participate in power control algorithm 800. On the other hand, if true, then a third constraint decision can be made (813). One possible constraint decision could attempt to maintain a quality of service (QoS) in the wireless network by comparing an estimated QoS if traffic were to be consolidated on either entity with a minimum QoS allowed. Depending on the wireless system constraints, an entity might not be allowed to participate if, for example, the consolidated traffic QoS would degrade below the allowed QoS threshold. On the other hand, if QoS can be maintained by both subsystems, then a fourth constraint decision can be made (814). For example, another possible operational constraint might prohibit either entity from participating during certain times of declared emergency (e.g., to assure that the entity is on so the wireless system is at full capacity to handle emergency call such as 911 services).

If no state of emergency is declared, then a fifth operational constraint decision can be made (815). For example, during certain peak traffic hours either entity might not be permitted to participate, or at certain hours the entity must be intentionally powered down. A sixth operational constraints decision (816) could prohibit call clearing in order to eliminate traffic that might no be suitable for handoff. A seventh operational constraints decision (810N) could be specifically set by an individual operator to prohibit specific entities to participate in PC mode for various reasons. Additional operational constraints decisions can be added to this method step or computer procedure. For example, a metric (817) could be employed to prohibit participation by an entity based upon an established probability of routing failure compared to an allowed probability of routing failure. Accordingly, a pair of entities is either deemed to support a power constraint (PC) mode (819), or required to employ various legacy non-energy savings modes (818).

If power constraint (PC) mode is allowed to proceed, then the power control algorithm 800 makes one or more comparisons between a plurality of entities based upon available traffic rates $R_{local}$ and $R_{remote}$ and the traffic capacities ($E_{local-rmax}$ and $E_{remot-rmax}$) of each entity (800A). For example, in a first scenario, referring again to FIG. 5 together with FIG. 7, a comparison (e.g. less than, greater or equal to) can be made between the sum of rates $R_{local}$ and $R_{remote}$ relative to $E_{local-rrmax}$ and the sum of rates $R_{local}$ and $R_{remote}$ relative to $E_{remote-rmax}$ (820). All combinations are compared (800A) to determine whether either $E_{local}$ or $E_{remote}$ can handle the combined load (821), only $E_{local}$ can handle both loads (851), only $E_{remote}$ can handle both loads (861), or whether both $E_{local}$ and $E_{remote}$ are necessary to handle both loads 863. For example, if $R_{local}+R_{remote}<E_{local-rmax}$ and $R_{local}+R_{local}<E_{remote-rmax}$, then either $E_{remote}$ or $E_{local}$ can support both traffic loads (821), and there is an opportunity to move all traffic to one entity and to shut off the power to the entity with no traffic. In this case (821) additional comparisons, as will be described, are necessary to determine the best entity to turn off in order to minimize energy consumption.

Several differentiators can be applied to the first scenario 821 where either a local or remote subsystem can handle combined traffic rate $R_{local}+R_{remote}$. For example, in one possible embodiment of the present invention, the power consumption of the local entity $E_{local-pon}$ and the remote entity $E_{remote-pon}$ can be compared to determine which entity consumes the most power (800B). If $E_{remote}$ consumes more power than $E_{local}$, then $E_{remote}$ is turned off 823 and both traffic loads are routed through $E_{local}$ 824. If $E_{local}$ consumes more power than $E_{remote}$, then $E_{local}$ is turned off 827 and both traffic steams are routed through $E_{remote}$ 828. The entities can attempt at another time to participate in the power control algorithm 800 at a later time (890) when the distributed power control algorithm begins again at start 1 (801). In the case where $E_{remote}$ and $E_{local}$ have the same power consumption (i.e. $E_{local-pon}=E_{remote-pon}$) (829), another differentiator is needed. In another embodiment of the present invention, the data rates of one or more traffic routes can be compared (800C) For example, if $R_{local}<R_{remote}$ (830) then it would minimize the amount of traffic being handed off if traffic were to be consolidated on $E_{remote}$ 832 and $E_{local}$, is turned off 831. Alternatively, if $R_{local}>R_{remote}$ (834) then $E_{remote}$ is shut off (835) and traffic is consolidated on $E_{local}$ (836). The entities can attempt at another time to participate in the power control algorithm 800 at a later time (890) when the distributed power control algorithm begins again at start 1 (801). The idea being that by moving traffic away from the lower data rate load, there is less chance of handoff failure than moving the higher data rate load. The particular choice may depend on other factors and it may be more beneficial make the opposite decision in which case the highest target data rate load is moved. In the case that the data rates are equal ($R_{local}=R_{remote}$) (837), yet another differentiator can be employed, such as a comparison of the capacity of the entities can be compared (880E). For example, if $E_{local-rrmax}<E_{remote-rmax}$ (838), then $E_{local}$, the entity with the lower capacity can be shut off (839), and all traffic will be routed to $E_{remote}$, the entity the entity with greater capacity (840). Alternatively, if $E_{local-rmax}>E_{remote-rmax}$ (842), then $E_{remote}$, the entity with the lower capacity, can be shut off (843) and all traffic will be routed to $E_{local}$, the entity with greater capacity (844). If $E_{local-rmax}=E_{remote-rmax}$ (845), then either the DPC will contain another differentiator or simply turn on both entities (844) (e.g., route $R_{local}$ to $E_{local}$ and $R_{remote}$ to $E_{remote}$) as if in non-PC mode. The entities can attempt at another time to participate in the power control algorithm 800 at a later time (890) when the distributed power control algorithm begins again at start 1 (801).

In second scenario (850), according to the power control algorithm 800, another comparison can be made between the plurality of entities based upon available traffic loads and the traffic capacities of each entity. In the second scenario, the available traffic loads are less than the capacity of $E_{local}$, and the available traffic loads are equal to or less than the capacity of $E_{remote}$, ($R_{local}+R_{remote}<E_{local-rmax}$ and $R_{local}+R_{remote}>=E_{remote-rmax}$) (850). In this second scenario, $E_{remote}$ can be shut off (851) with traffic $R_{local}$ and $R_{remote}$ routed to $E_{local}$ (852). The entities can attempt at another time to participate in the power control algorithm 800 at a later time (890) when the distributed power control algorithm begins again at start 1 (801).

In a third scenario 860 according to the power control algorithm 800, yet another comparison can be made between the plurality of entities based upon available traffic loads and the traffic capacities of each entity. In the third scenario, the available traffic loads $R_{local}$ and $R_{remote}$ are less than or equal to the capacity of $E_{local}$ and greater than the capacity of $E_{remote}$ ($R_{local}+R_{remote}>=E_{local-rmax}$ and $R_{local}+R_{remote}<E_{remote-rmax}$) (860). In the third scenario, $E_{local}$ is turned off (861), and traffic $R_{local}$ and $R_{remote}$ is routed to $E_{remote}$ (862). If neither $E_{local}$ or $E_{remote}$, can handle the combined load as in 851 or 861, then there is no need to compare power consumption or break ties as was necessary in the first scenario 821, where either $E_{local}$ or $E_{remote}$ can support the combined load $R_{local}+R_{remote}$. The entities can attempt at another time to participate in the power control algorithm 800 at a later time (890) when the distributed power control algorithm begins again at start 1 (801).

In the fourth scenario (883), the available combined traffic load, $R_{local}+R_{remote}$, is greater than, or equal to, the traffic capacities of each entity, $E_{local}$ and $E_{remote}$ ($R_{local}+R_{remote}>=E_{local-rmax}$ and $R_{local}+R_{remote}>=E_{remote-rmax}$) (863). In the fourth scenario, both entities $E_{local}$ and $E_{remote}$ are necessary to support the traffic load; however, addition differentiation is needed to know whether normal routing ($R_{local}$ to $E_{local}$ and $R_{remote}$ to $E_{remote}$) swapped routing ($R_{local}$ to $E_{remote}$ and $R_{remote}$ to $E_{local}$), or no routing is less than the capacities of $E_{local}$ and $E_{remote}$.

In one possible embodiment of the present invention, a differentiator can be applied to the fourth scenario, such as a comparison of individual rates with the capacity of the target entities (800D). For example, if the first traffic load, $R_{local}$, is less than, or equal to, the capacity of $E_{local}$, and the second traffic load, $R_{remote}$ is less than, or equal to, the capacity of $E_{remote}$ ($R_{local}<=E_{local-rmax}$ and $R_{remote}<E_{remote-rmax}$) (880). In this case, the first traffic load, $R_{local}$, is routed to $E_{local}$, and the second traffic load $R_{remote}$ is routed to $E_{remote}$ (881), which is the same operation that would occur in non-energy savings mode, such that non-PC mode (i.e. non-combined) traffic routing would occur (882). In the case where the first traffic load, $R_{local}$, is deemed less than or equal to the capacity of $E_{remote}$, and the second traffic load, $R_{remote}$, is less than or equal to the capacity of $E_{local}$ ($R_{local}<=E_{remote-rmax}$ and $R_{remote}<=E_{local-rmax}$)(884), there is a benefit of not exceeding $E_{local}$ or $E_{remote}$'s maximum capacity by swapping routes (886). Specifically, $R_{local}$ is routed to $E_{remote}$ and $R_{remote}$ is routed to $E_{local}$. Otherwise, one of the rates exceeds the capacity of one of the entities and recovery action, such as bringing more resources on line to increase capacity, is required (888). In recovery actions, a traffic controller can postpone transmission by first-in-first-out (FIFO) buffing the data temporarily, which can limit the rate to the maximum rate of the entity. After (and if) the rate falls below the maximum rate, the buffer will empty. The entities can attempt at a later time to participate in power control algorithm 800 (890) when the distributed power control algorithm begins again at start 1 (801).

(ii) Distributed Traffic Control

Figure 9:
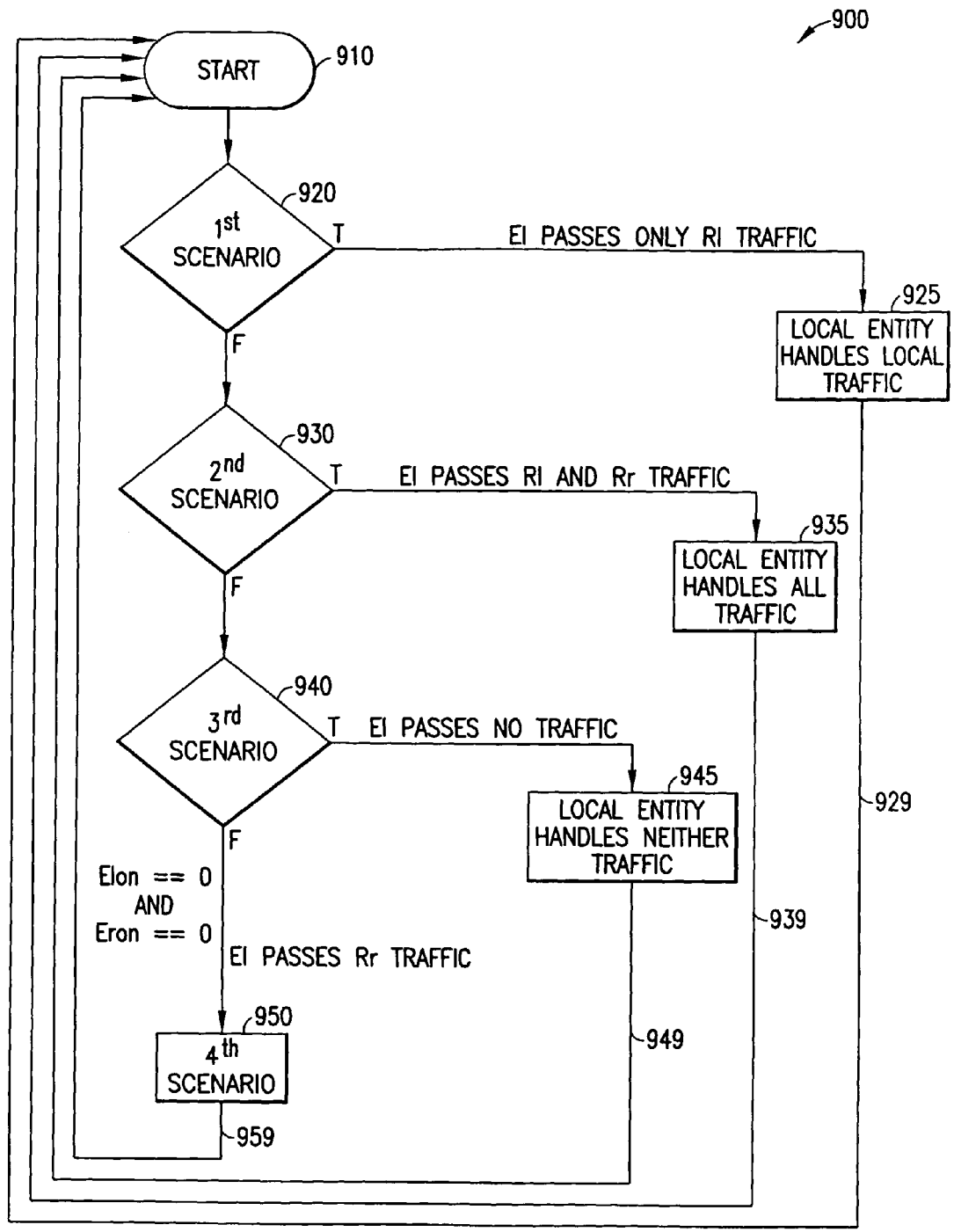
FIG. 9 is a non-limiting example of a distributed traffic control algorithm suitable for carrying out one or more embodiments of this invention.

Referring now to FIG. 9(b), a non-limiting example of an algorithm for the distributed traffic control 900 is shown in accordance with one or more possible embodiments of the present invention. The illustration of a particular order to the blocks does not necessarily imply that there is a required or preferred order for the blocks and the order and arrangement of the blocks may be varied. Furthermore, it may be possible for some blocks to be omitted.

Referring to FIG. 5 (720/720N), the purpose of the distributed traffic controllers is to route traffic loads $R_1$, $R_2$, or $R_1+R_2$ to the power controlled entities 730/730N. It is desirable in one possible embodiment of the present invention that distributed traffic controllers start and execute synchronously (i.e. at the same controller sample time) under the condition that each distributed traffic controller makes the same decision given the same values of each pair of inputs (e.g. $E_{11on}$ and $E_{12on}$).

For the purpose of discussing an example of the distributed traffic control method and computer program (FIG. 9(b)), this document refers to a local power controlled entity, $E_{local}$, and remote power controlled entity, $E_{remote}$. Each distributed traffic controller receives control signals $E_{local-on}$ and $E_{remote-on}$ from the distributed traffic controller. With each cycle of the method, each distributed traffic controller outputs combined routed traffic $R_c$ having one of four traffic rates as follows: $R_{local}$, $R_{remote}$, $R_{local}+R_{remote}$, or zero. In such a scenario the remote traffic $R_{remote}$ is provided to the distributed traffic controller via inter-entity routing 446.

In a first scenario, control signals $E_{local-on}$ and $E_{remote-on}$ are both on (true) which indicates that the local entity, $E_{local}$, and remote entity, $E_{remote}$, are both powered on (920). Accordingly, the combined routed traffic, $R_c$, is handled by each power controlled entity such that $R_c=R_{local}$ (925). In other words, they each handle their own traffic. For example, referring back to FIG. 5, DTC 720 passes only $R_1$ traffic to power controlled entity $E_1$ while DTC 720N passes only $R_2$ traffic to power controlled entity $E_2$. In a second scenario, control signals $E_{local-on}$ is on and $E_{remote-on}$ is off (false) which indicates that the local entity, $E_{local}$, is powered on and the remote entity, $E_{remote}$, is powered off (930). Accordingly, the local entity, $E_{local}$, passes combined traffic $R_{local}+R_{remote}$ (e.g., $R_1+R_2$ from FIG. 5), while $E_{remote}$ passes no traffic since it is turned off (935). In a third scenario, control signals $E_{local-on}$ is off and $E_{remote-on}$ is on which indicates that the local entity, $E_{local}$, is powered off, and remote entity, $E_2$, is powered on (940). Accordingly, $E_{local}$ passes no traffic (945) and the remote entity passes combined traffic $R_{local}+R_{remote}$. For the remaining choice, in the fourth scenario, control signals $E_{local-on}$ is off and $E_{remote-on}$ is off which indicates the previously mention swap situation so local entity $E_{local}$ and the remote entity $E_{remote}$ are both turned on (950). In the swap situation, $E_{local}$ passes $R_{remote}$ and $E_{remote}$ passes $R_{local}$.

(iii) Simulations Results

Referring now to FIG. 10 an illustration of an example of simulation of functional operation of the system of distributed power and traffic control methods and computer programs 1100 is shown. The data is FIG. 10 is the results of a MATHLAB™ simulation using a 20 data rate sample according to one possible embodiment of the present invention. The simulation design of the distributed power and traffic control which generated the output shown is depicted in FIG. 5. The actual non-limiting sample code (and additional simulation results) is described in the appendix that follows this document. The conditions that impact the power controller decisions (e.g., simulation input statics values) are $E_{1rmax}$ 1.25 bits/sample, $E_{2rmax}$ 0.95 bits/sample, $E_{1pon}$ 1 Watts, and $E_{2pon}$ 0.5 Watts. The number of data-rate samples is 20 and the number of simulation points per data-rate sample is 5. The number of simulation samples points is 100 (i.e. 20*5) and the simulation initial conditions are $E_{11on}=0$, $E_{12on}=0$, $E_{21on}=0$, $E_{22on}=0$. As shown in FIG. 10, the table columns are time-sample i, input bearer rates, r1 ($R_1$) and r2 ($R_2$) in bits per time-sample, the distributed power controller outputs are, $E_{11on}$, $E_{12on}$, $E_{21on}$, and $E_{22on}$, where 0 means off (false) and 1 means on (true), and the combined data rate out of the distributed traffic controllers, rc1, rc2 (e.g. $R_1$, $R_2$, $R_1+R_2$, or 0) in bits per time-sample. As a model of bearer traffic, the input bearer rates, $R_1$ and $R_2$, are randomly selected from a uniform probability distribution ranging from 0.0 to 1.0. It is understood that bearer traffic on real systems often cycles over a 24 hour period or has various distributions other than uniform, but the uniform model provide an efficient model for simulation of the controller algorithms.

Considering sample 003 of FIG. 10, note that $R_1$ and $R_2$ are small relative to $E_{1rmax}$ and $E_{2rmax}$. Either Power Controlled Entity $E_1$ or $E_2$ 730/730N, can handle the combined rate $R_1+R_2$. The distributed power controllers chose the low power consumption solution by routing $R_1$ and $R_2$ to Power Controlled Entity E2 (730N). For sample 003, $R_{c2}=R_1+R_2$ (e.g. 0.746=0.219+0.527), which leaves no traffic for Power Control Entity $E_1$ 730 to handle. As such, $E_1$ was shut off to reduce energy consumption. Note that both distributed power controllers made the same decision. Specifically, distributed power controller 1 710 decided to turn $E_1$ off as indicated in FIG. 10 where $E_{11on}$ is 0. Also, distributed power controller 2 710N made the same decision regarding entity $E_1$ by as indicated in FIG. 10 that $E_{21on}$ is 0 (e.g. off). In addition, distributed power controller 2 decided to turn on $E_2$ as indicated by $E_{22on}$ being 1 and distributed power controller 1 agreed by indicating that $E_{12on}$ is 1.

Considering sample 013 of FIG. 10, both $E_1$ and $E_2$ must be turned on in order to support rates $R_1$ and $R_2$. Both distributed power controllers reached the same decision that $E_1$ and $E_2$ should be turned on. $R_1$ is routed to rc1 and $R_2$ is routed to rc2.

Considering sample 018 of FIG. 10, $E_1$ has sufficient capacity, $E_{1rmax}$, to support both loads, $R_1+R_2$, but $E_2$ does not have sufficient capacity to support $R_1+R_2$. Even though $E_1$ requires more power than $E_2$, the distributed power controllers chose to turn on $E_1$ and turn off $E_2$.

Considering sample 068 of FIG. 10, $R_2$ is greater than $E_{2rmax}$ but less than $E_{1rmax}$. $R_1$ is less than both $E_{2rmax}$ and $E_{1rmax}$ so either power controlled entity can pass $R_1$. Although not enabled in the simulation or shown in sample 068, $R_2$ and $R_1$ can be swapped such that $R_2$ goes out $E_1$ and $R_1$ goes out $E_2$ without exceeding $E_{1rmax}$ and $E_{2rmax}$. Note that in order to support the "swapping" of the bearer paths, the distributed power controller output an additional signal (not shown) that the distributed traffic controller and the power controlled entity receives and uses to enable the swap.

A program storage device as in any above, wherein the program storage device comprises a computer-readable medium, a computer-readable memory, a memory, a memory card, a removable memory, a storage device, a storage component and/or a storage circuit. A program storage device as in any above, further comprising one or more aspects of the exemplary embodiments of the invention as described elsewhere herein, and, in particular, one or more aspects of the exemplary embodiments of the invention as relating to exemplary methods described herein.

The exemplary embodiments of the invention, as discussed above and as particularly described with respect to exemplary methods, may be implemented as a computer program product comprising program instructions embodied on a tangible computer-readable medium. Execution of the program instructions results in operations comprising steps of utilizing the exemplary embodiments or steps of the method.

The exemplary embodiments of the invention, as discussed above and as particularly described with respect to exemplary methods, may be implemented in conjunction with a program storage device (e.g., a computer-readable medium, a memory) readable by a machine (e.g., a computer, a mobile station, a mobile device, a mobile node), tangibly embodying a program of instructions (e.g., a program, a computer program) executable by the machine (e.g., by a processor, by a processor of the machine) for performing operations. The operations comprise steps of utilizing the exemplary embodiments or steps of the method.

The various blocks shown in FIGS. 5-9 may be viewed as method steps, as operations that result from operation of computer program code and/or as one or more coupled components (e.g., function blocks, circuits, integrated circuits, logic circuit elements) constructed to carry out the associated function(s). The blocks may also be considered to correspond to one or more functions and/or operations that are performed by one or more components, apparatus, processors, computer programs, circuits, integrated circuits, application-specific integrated circuits (ASICs), chips and/or function blocks. Any and/or all of the above may be implemented in any practicable arrangement or solution that enables operation in accordance with the exemplary embodiments of the invention.

Furthermore, the arrangement of the blocks shown in FIGS. 5-9 should be considered merely exemplary and non-limiting. It should be appreciated that the blocks may correspond to one or more functions and/or operations that may be performed in any order (e.g., any practicable, suitable and/or feasible order) and/or concurrently (e.g., as practicable, suitable and/or feasible) so as to implement one or more of the exemplary embodiments of the invention. In addition, one or more additional steps, functions and/or operations may be utilized in conjunction with those illustrated in FIGS. 5-9 so as to implement one or more further exemplary embodiments of the invention, such as those described in further detail herein.

That is, the non-limiting, exemplary embodiments of the invention shown in FIGS. 5-9 may be implemented, practiced or utilized in conjunction with one or more further aspects in any combination (e.g., any combination that is practicable, suitable and/or feasible) and are not limited only to the blocks, steps, functions and/or operations illustrated in FIGS. 5-9.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other wireless communication systems such as, for example, (WLAN, UTRAN, CDMA, GSM as appropriate).

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein, two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical region (both visible and invisible), as several non-limiting and non-exhaustive examples.

Further, the various names used for the described parameters (e.g. $E_1$, $E_2$, $E_{1on}$, $E_{2on}$, $E_{local-rmax}$, $E_{remote-rmax}$ $E_{remote}$, $E_{local}$, $E_{22on}$, $E_{21on}$, $R_{c1bb}$, $R_{c2bb}$, $R_1$, $R_2$, $R_{local}$, $R_{remote}$, $R_c$, etc.) are not intended to be limiting in any respect, as these parameters may be identified by any suitable names. Moreover, the specific pinouts 1-10 shown in FIG. 5 are not intended to be limiting as any suitable microprocessor/microcontroller, programmable program chip, digital signal processor (DSP) or field programmable gate array (FPGA) may be employed. Further, the formulas and expressions that use these various parameters may differ from those expressly disclosed herein.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controllers, other computing devices and/or some combination thereof.

The exemplary embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of exemplary and non-limiting examples a full and informative description of the invention. However, various modifications and adaptations may become apparent to those skilled in the relevant arts in view of the foregoing description, when read in conjunction with the accompanying drawings. However, all such and similar modifications of the teachings of this invention will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

APPENDIX

Simulation variables and constants at top-level program (Equivalent to FIG. 5) (Variables ending in "q" denotes delay to the previous simulation sample or state as in the "q" output of an integrated circuit D-type flip-flop):

e11on DPC1 output, 0 or 1, indicating whether or not DPC1 is turning on Entity 1.

e12on DPC1 output, 0 or 1, indicating a copy of whether DPC2 will turn on Entity 2 e1energy the energy, Watt-samples, consumed by Entity 1 (i.e. the cumulative power from simulation sample points 1 to i) for the simulation samples in which E2 is turned on.).

e1$p$on The power consumption, Watts, of entity 1 when entity 1 is turned on.

e1rmax The traffic capacity, bits per simulation sample, (i.e. maximum traffic rate) of entity 1 when entity 1 is turned on.

e21on DPC2 output, 0 or 1, indicating a copy of whether DPC1 will turn on Entity 2 e22on DPC2output, 0 or 1, indicating whether or not DPC2 is turning on Entity 2.

e2energy The energy, Watt-samples, consumed by Entity 2 (i.e. the cumulative power from time 0 to i for the simulation samples in which E2 is turned on.)

e2pon The power consumption, Watts, of entity 2 when entity 2 is turned on.

e2rmax The traffic capacity, bits per simulation sample, (i.e. maximum traffic rate) of entity 2 when entity 2 is turned on.

energymax. The energy consumed, Watt-samples, if both Entity 1 and Entity 2 are turned on all the time. Energymax is the energy consumed by non-power constrained mode.

i simulation sample point (equivalent to time).

m number of simulation samples per data rate sample. The total number of simulation samples is m*n.

n number of data rate samples.

r1 traffic route 1 having data rate of r1 bits per simulation sample.

r1q traffic route 1 having data rate of r1 bits per simulation sample delayed by one simulation sample.

r2 traffic route 2 having data rate of r2 bits per simulation sample.

r2q traffic route 2 having data rate of r2 bits per simulation sample delayed by one simulation sample.

rc1 DTC1 output, combined output traffic having a data rate of rc1 bits per simulation sample rc2 DTC2 output, combined output traffic having a data rate of rc1 bits per simulation sample Simulation variables within the distributed power controller sub-routine (Equivalent to FIG. 7):

elon DPC output. $E_{local-on}$, 0 or 1.

elpon DPC input. $E_{local}$ power consumption, Watts, when $E_{local}$ is turned on elrmax DPC input. The traffic capacity, bits per simulation sample, (i.e. maximum traffic rate) of $E_{local}$ when $E_{local}$ is turned on.

eron DPC output. $E_{remote-on}$, 0 or 1.

erpon DPC input. $E_{remote}$ power consumption, Watts, when $E_{remote}$ is turned on errmax DPC input. The traffic capacity, bits per simulation sample, (i.e. maximum traffic rate) of $E_{remote}$ when $E_{remote}$ is turned on.

rl DPC input. traffic route $R_{local}$ having data rate of $R_{local}$ bits per simulation sample.

rr DPC input. traffic route $R_{remote}$ having data rate of $R_{remote}$ bits per simulation sample Simulation variables within the distributed traffic controller sub-routine (Equivalent to FIG. 9(b)):

elon DTC input. $E_{local-on}$, 0 or 1.

eron DTC input. $E_{remote-on}$, 0 or 1.

rc DTC output. Combined output traffic having a data rate of rc bits per simulation sample rlq DTC input. Traffic route $R_{local}$ having data rate of $R_{local}$ bits per simulation sample and delayed by one simulation sample.

rrq DPC input. traffic route $R_{remote}$ having data rate of $R_{remote}$ bits per simulation sample and delayed one simulation sample.

Matlab 5.3.1 Code

```
%opmd2.m -- optimized power management clear all;
global warnings;
%system static values
e1rmax = 1.25; %entity 1 max rate [0..2], assumes max r1 = 1.
e2rmax = .95; %entity 2 max rate [2..0], assumes max r2 = 1.
e1pon = 1; %entity 1 power on, watts
e2pon = .5; %entity 2 power on, watts
disp(sprintf('Optimized Power Management, Distributed v2r4(opmd)'))
disp(sprintf('Simulation input static values:'))
format='e1rmax: %g bits/sample\ne2rmax: %g bits/sample';
disp(sprintf(format, e1rmax, e2rmax))
format='e1pon: %g Watts\ne2pon: %g Watts\n';
disp(sprintf(format, e1pon, e2pon))
%simulation values
n = 20; %number of data rate samples
m = 5; %number of points per sample
listlimit = 20; %number of data-rate samples to list
start = 3; %data-rate list starting simulation sample
format='Number of data-rate samples: %g';
disp(sprintf(format,n))
format='Number of simulation points per data-rate sample: %g';
disp(sprintf(format,m))
format='Simulation samples points: %g\n';
disp(sprintf(format,n*m))
%simulation initial conditions
%initially turn on all entities off to aid start up understanding.
e11on=0;
e12on=0;
e21on=0;
e22on=0;
warnings=0; %set to 0 for normal complete, increment each warning.
format='Simulation initial conditions:';
disp(sprintf(format));
format='e11on: %g\ne12on: %g\ne21on: %g\ne22on: %g';
disp(sprintf(format, e11on, e12on, e21on, e22on));
format='warnings: %g\n';
disp(sprintf(format, warnings));
%create a vector of random traffic load
rand('seed',0);
r1 = rand(1,n); %arbitrary uniform (0,1) distribution, r1 max = 1.0
r2 = rand(1,n); %arbitrary uniform (0,1) distribution, r2 max = 1.0
%
%special test cases
%r2=r1;
%r1=zeros(1,n*m);
%r2=zeros(1,n*m);
%r1=ones(1,n*m);
%r2=ones(1,n*m);
%stretch the samples so that each random sample is replicated m times.
for i=0:n-1
    for j=0:m-1
        r1t(m*i+j+1)=r1(i+1);
        r2t(m*i+j+1)=r2(i+1);
    end
end
r1=r1t;
r2=r2t;
clear r1t r2t %temp variable no longer needed for simulation.
format='Data-Rates, Distributed Uniform[0,1] unless constant';
disp(sprintf(format))
format='r1 min: %g, r1 max: %g';
disp(sprintf(format,min(r1),max(r1)))
format='r2 min: %g, r2 max: %g\n';
disp(sprintf(format,min(r2),max(r2)))
%Process state machine through all samples.
%Using old register transfer notation for the simulation,
%the output of registers, denoted by q suffix, and the outputs of
%the stateless controllers are buffered in registers by storing time
%sample i+1).
%
for i=1:n*m
    r1q(i+1)=r1(i);
    r2q(i+1)=r2(i);
    %entity 1
    [e11on(i+1),e12on(i+1)]=dpc(r1(i),r2(i),e1pon,e2pon,e1rmax,e2rmax);
```

| %opmd2.m -- optimized power management |
| --- |

```
[rc1(i+1)]=dtc(r1q(i),r2q(i),e11on(i),e12on(i));
%entity 2
%Assume entity 2 has it's own dpc and dtc controllers.
%e2's dpc is a duplicate of e1's dpc with
%inputs and outputs reversed, which makes e1 remote to e2.
%Similarly, e2's dtc is a
%duplicate of e1's dtc with dtc pair-wise variables reversed.
[e22on(i+1),e21on(i+1)]=dpc(r2(i),r1(i),e2pon,e1pon,e2rmax,e1rmax);
[rc2(i+1)]=dtc(r2q(i),r1q(i),e22on(i),e21on(i));
%tested various pairwise inputs and pairwise outputs reversals.
% Result: any pairwise reversal results in failures (warnings)
% although for the r1 and r2 reversal of dpc inputs the failure in
% only if e1pon==e2pon.
%
% as designed baseline:
% normal completion, no warnings
% [e22on(i+1),e21on(i+1)]=dpc(r2(i),r1(i),e2pon,e1pon,e2rmax,
e1rmax);
% [rc2(i+1)]=dtc(r2q(i),r1q(i),e22on(i),e21on(i));
%
% dpc outputs e22on and e21 on reversed,
% completion with warnings: dpc outputs don't match
% [e21on(i+1),e22on(i+1)]=dpc(r2(i),r1(i),e2pon,e1pon,e2rmax,
e1rmax);
% [rc2(i+1)]=dtc(r2q(i),r1q(i),e22on(i),e21on(i));
%
% dpc r1 and r2 inputs reversed,
% if e1pon <> e2pon, normal completion, no warnings.
% if e1pon==e2pon, warnings: data rates don't match
% [e22on(i+1),e21on(i+1)]=dpc(r1(i),r2(i),e2pon,e1pon,e2rmax,
e1rmax);
% [rc2(i+1)]=dtc(r2q(i),r1q(i),e22on(i),e21on(i));
%
% dpc e2pon and e1pon reversed.
% if e1pon <> e2pon, warnings: data rates don't match.
% [e22on(i+1),e21on(i+1)]=dpc(r2(i),r1(i),e1pon,e2pon,e2rmax,
e1rmax);
% [rc2(i+1)]=dtc(r2q(i),r1q(i),e22on(i),e21on(i));
%
% dpc e2rmax and e1rmax reversed.
% completion with warnings: data rates and dpc outputs don't match.
% [e22on(i+1),e21on(i+1)]=dpc(r2(i),r1(i),e2pon,e1pon,e1rmax,
e2rmax);
% [rc2(i+1)]=dtc(r2q(i),r1q(i),e22on(i),e21on(i));
%
% dtc r1 and r2 inputs reversed.
% completion with warnings: dpc outputs don't match
% [e22on(i+1),e21on(i+1)]=dpc(r2(i),r1(i),e2pon,e1pon,e2rmax,
e1rmax);
% [rc2(i+1)]=dtc(r1q(i),r2q(i),e22on(i),e21on(i));
%
% dtc e21on(i), e22on(i) reversed.
% completion with warnings: dpc outputs don't match
% [e22on(i+1),e21on(i+1)]=dpc(r2(i),r1(i),e2pon,e1pon,e2rmax,
e1rmax);
% [rc2(i+1)]=dtc(r2q(i),r1q(i),e21on(i),e22on(i));
%
%determine energy (cumulative power)
if i==1
    e1energy(i)=e1pon*e11on(i);
    e2energy(i)=e2pon*e22on(i);
    energymax(i)=e1pon+e2pon;
else %i>=2
    e1energy(i)=e1energy(i-1)+e1pon*e11on(i);
    e2energy(i)=e2energy(i-1)+e2pon*e22on(i);
    energymax(i)=energymax(i-1)+e1pon+e2pon;
end
%Test that both distributed power controllers are giving
%the same outputs, i.e. the local of e1 should match the remote of e2
% and the remote of e1 should match the local of e2.
format1='i+1: %g, (e11on(i+1): %g, e21on(i+1): %g,';
format2=' e12on(i+1): %g, e22on(i+1): %g';
if e11on(i+1)==e21on(i+1) & e12on(i+1)==e22on(i+1)
    %disp(sprintf(strcat(format1,format2),i+1,e11on(i+1),...
    %  e21on(i+1), e12on(i+1), e22on(i+1)));
    %disp(' ok')
    %normcompelete remains 0;
else
```

| %opmd2.m -- optimized power management |
| --- |

```
    %not ok, outputs differ
    disp(sprintf(strcat(format1,format2),i+1,e11on(i+1), ...
      e21on(i+1), e12on(i+1), e22on(i+1)));
    disp(sprintf(' warning **** dpc outputs do not match *****\n'))
    warnings=warnings+1;
end
%test that input data rates match output data rates
%i.e. no bearer data gained or lost
if (r1q(i)+r2q(i))==(rc1(i+1)+rc2(i+1))
    %data rates match, do nothing
    %format='i+1: %g, r1q(i): %g, r2q(i): %g, r1q(i)+r2q(i): %g';
    %disp(sprintf(format, i+1, r1q(i), r2q(i), r1q(i)+r2q(i)));
    %format1='i+1: %g, rc1(i+1): %g, rc2(i+1): %g,';
    %format2='rc1(i+1)+rc2(i+1): %g';
    %disp(sprintf(strcat(format1,format2), i+1, rc1(i+1),...
    %   rc2(i+1), rc1(i+1)+rc2(i+1)));
    %disp(sprintf(' data rates OK'));
    %warnings remains 0;
else
    %data rates do not match, display warning
    format='i+1: %g, r1q(i): %g, r2q(i): %g, r1q(i)+r2q(i): %g';
    disp(sprintf(format, i+1, r1q(i), r2q(i), r1q(i)+r2q(i)));
    format1='i+1: %g, rc1(i+1): %g, rc2(i+1): %g,';
    format2=' rc1(i+1)+rc2(i+1): %g';
    disp(sprintf(strcat(format1,format2), i+1, rc1(i+1),...
      rc2(i+1), rc1(i+1)+rc2(i+1)));
    disp(sprintf(' **** warning, data rates do not match ****\n'));
    warnings=warnings+1;
end
%comment if rate exceeds rmax
if (rc1(i) < e1rmax) & (rc2(i) < e2rmax)
    if e11on(i) == 0 & e22on(i) == 0
        comment(i) = {'e1 off and e2 off'};
    elseif e11on(i)==0 & e22on(i)==1
        comment(i) = {'energy savings, e1 off'};
    elseif e11on(i)==1 & e22on(i) == 0
        comment(i) = {'energy savings, e2 off'};
    else %e11on(i)==1 a& e22on(i) == 1
        comment(i)={'normal'};
    end
elseif (rc1(i) < e2rmax) & (rc2(i) < e1rmax)
    comment(i)={'swap possible'};
else % or((rc1(i) > e1rmax),(rc2(i) > e2rmax))
    comment(i)={'rate > rmax'};
end
end
figure(1)
plot(1:n*m,r1(1:n*m)+r2(1:n*m),'+-', 1:n*m,r1(1:n*m),'o:',...
    1:n*m,r2(1:n*m),'x-.')
figure(2)
plot(1:n*m,r1(1:n*m)+r2(1:n*m),'+-', 1:n*m,e11on(1:n*m),'o:',...
    1:n*m,e22on(1:n*m),'x-.')
figure(3)
plot(1:n*m,r1(1:n*m)+r2(1:n*m),'+-', 1:n*m,rc1(1:n*m),'o:',...
    1:n*m,rc2(1:n*m),'x-.')
figure(4)
plot(1:n*m,e1energy(1:n*m)+e2energy(1:n*m),'+-', ...
    1:n*m,e1energy(1:n*m),'o:',...
    1:n*m,e2energy(1:n*m),'x-.', 1:n*m,energymax(1:n*m),'*-')
%disp(sprintf('Simulation results:'))
format='\nSimulation results (samples points 1 through %g):';
disp(sprintf(format,n*m));
format='e1 always-on energy consumed: %g Watt-samples';
disp(sprintf(format,e1pon*n*m))
format='e1 energy consumed: %g Watt-samples, Prob{e11on==1}: %g';
disp(sprintf(format,sum(e11on(1:size(e11on,2)-1))*e1pon,...
    sum(e11on(1:size(e11on,2)-1))/(n*m)))
format='e2 always-on energy consumed: %g Watt-samples';
disp(sprintf(format,e2pon*n*m))
format='e2 energy consumed: %g Watt-samples, Prob{e22on==1}: %g';
disp(sprintf(format,sum(e22on(1:size(e22on,2)-1))*e2pon,...
    sum(e22on(1:size(e22on,2)-1))/(n*m)))
format='System always-on total energy: %g Watt-samples';
disp(sprintf(format,energymax(length(energymax))))
format1='System energy consumed: %g Watt-samples,';
format2=' consumed/always-on: %g';
disp(sprintf(strcat(format1,format2), ...
    e1energy(length(e1energy))+e2energy(length(e2energy)), ...
```

%opmd2.m -- optimized power management

```
    (e1energy(length(e1energy))+e2energy(length(e2energy)))/...
    energymax(length(energymax-1))));
format='Energy savings: %g Watt-samples, saved/always-on: %g';
disp(sprintf(format,energymax(length(energymax))...
    -(e1energy(length(e1energy))+e2energy(length(e2energy))),...
    (energymax(length(energymax))...
    -(e1energy(length(e1energy))+e2energy(length(e2energy))))/...
    energymax(length(energymax))))
format='\n   i   r1   r2 e11on e12on e21on e22on   rc1   rc2';
disp(sprintf(format))
format='%4.3d %4.3f %4.3f %5.0f %5.0f %5.0f %5.0f %4.3f %4.3f %s';
if n > listlimit
    for i=start:m:listlimit*m
        disp(sprintf(format, i, r1(i), r2(i), e11on(i), e12on(i),...
            e21on(i),e22on(i), rc1(i), rc2(i), char(comment(i))))
    end
    disp(sprintf('%g data-rate samples displayed',listlimit));
else
    for i=start:m:n*m
        disp(sprintf(format, i, r1(i), r2(i), e11on(i), e12on(i),...
            e21on(i),e22on(i), rc1(i), rc2(i), char(comment(i))))
    end
    disp(sprintf('%g data-rate samples displayed', n))
end
disp(sprintf('\n'));
clear i j format format1 format2
whos
if warnings == 0
    format='normal completion, no warnings';
    disp(sprintf(format));
else
    format='***** completion with %g warnings ******';
    disp(sprintf(format,warnings));
end
``` function [elon,eron] = dpc(rl, rr, elpon, erpon, elrmax, errmax)

```
function [elon,eron] = dpc(rl, rr, elpon, erpon, elrmax, errmax)
%The distributed power controller (dpc), version 2r4, takes in a
% local and remote sample of data rate, rl and rr,
% the local and remote power consumed by each entity, elpon, erpon,
% and the max data rate that the local and remote entity is capable of,
% elrmax, errmax.
%The distributed power controller
% outputs whether the local entitity is on, elon,
% or the remote entity is on, eron, or both need to be on in order to
% support the combined (rl+rr) data rate.
%If either el or e2 can handle the traffic, then controller shuts
% off the entity with the maximum power.
global warnings;
format='rl: %g, rr: %g; elrmax: %g, errmax: %g';
if (rl+rr < elrmax) & (rl+rr < errmax)
    %Either el or er can handle the combined traffic load.
    %pick the one with the least power
    if elpon < erpon
        elon=1;
        eron=0;
    elseif elpon > erpon
        elon=0;
        eron=1;
    elseif elpon == erpon
        %Break the tie by picking el or er with the most rate
        if rl < rr
            %rr is largest
            %send traffic to er
            elon=0;
            eron=1;
        elseif rl > rr
            %rl is largest
            %send traffic to el
            elon=1;
            eron=0;
        elseif rl==rr
``` function [elon,eron] = dpc(rl, rr, elpon, erpon, elrmax, errmax)

```
            %break 2nd-level tie
            if elrmax > errmax
                %send traffic to max capacity
                elon=1;
                eron=0;
            elseif elrmax < errmax
                elon=0;
                eron=1;
            elseif elrmax == errmax
                %break 3rd-level tie, both on
                %waste a little energy
                elon=1;
                eron=1;
                disp(sprintf(format, rl, rr, elrmax, errmax));
                format1='***** warning: could turn off el or e2';
                format2=' but can not decide which one';
                disp(sprintf(strcat(format1,format2)));
                warnings=warnings+1;
            else
                disp(sprintf('***** warning, should not get here'));
                warnings=warnings+1;
                elon=1;
                eron=1;
            end
        else
            disp(sprintf('***** warning, should not get here'));
            warnings=warnings+1;
            elon=1;
            eron=1;
        end
    else
        disp(sprintf('***** warning, should not get here'));
        warnings=warnings+1;
        elon=1;
        eron=1;
    end
elseif (rl+rr < elrmax) & (rl+rr >= errmax)
    %el can handle both loads
    elon=1;
    eron=0;
    %format='rl: %g, rr: %g, elrmax: %g, errmax: %g';
    %disp(sprintf(format, rl, rr, elrmax, errmax));
    %stop
elseif (rl+rr >= elrmax) & (rl+rr < errmax)
    %er can handle both loads
    elon=0;
    eron=1;
    %format='rl: %g, rr: %g, elrmax: %g, errmax: %g';
    %disp(sprintf(format, rl, rr, elrmax, errmax));
    %stop
elseif (rl+rr >= elrmax) & (rl+rr >= errmax)
    %el and er both needed to handle loads
    elon=1;
    eron=1;
    if (rl <= elrmax) & (rr <= errmax)
        %normal
        %disp(sprintf('***** normal, no swap'))
    elseif (rl <= errmax) & (rr <= elrmax)
        %swap paths
        disp(sprintf(format, rl, rr, elrmax, errmax));
        disp(sprintf('***** warning, swap possible'))
        warnings=warnings+1;
    else
        %rl or rr exceeds elrmax or errmax
        disp(sprintf(format, rl, rr, elrmax, errmax));
        disp(sprintf('**** warning rl or rr exceeds elrmax or errmax'))
        warnings=warnings+1;
    end
else
    disp(sprintf('***** warning, should not get here'));
    warnings=warnings+1;
    elon=1;
    eron=1;
end
```

```
function [rc] = dtc(rlq, rrq, elon, eron)
%The distributed traffic controler, version 2r4,
%takes in samples of data, rlq and rrq, and indications, elon and eron,
whether one or both of the entities used to transmit the data are turned on.
%Entity, er, is remote to each call of ctd so if eron==1, it is assumed
%that er handles the er traffic and er's traffic, rrq, is excluded from
%the combined output, rc.
%Conversely, if eron==0 it is assumed that el, e local, needs to handle
%er's traffic and thus includes rrq in rc.
if (elon==1) & (eron==1)
    rc = rlq;
elseif (elon==1) & (eron==0)
    rc=rlq+rrq;
elseif (elon==0) & (eron==1)
    rc=0;
elseif (elon==0) & (eron==0)
    rc=rrq;
    if rlq > 0
        error('local data available to transmit, but el not turned on')
    end
else
    error('invalid elon or eron')
end
```

Simulation Results—20 Data-Rate Sample Test Case

Listing

» opmd2
Optimized Power Management, Distributed v2r4(opmd)
Simulation input static values:
e1rmax: 1.25 bits/sample
e2rmax: 0.95 bits/sample
e1pon: 1 Watts
e2pon: 0.5 Watts
Number of data-rate samples: 20
Number of simulation points per data-rate sample: 5
Simulation samples points: 100
Simulation initial conditions:
e11on: 0
e12on: 0
e21on: 0
e22on: 0
warnings: 0
Data-Rates, Distributed Uniform[0,1] unless constant
r1 min: 0.00769819, r1 max: 0.934693
r2 min: 0.0474645, r2 max: 0.991037
Simulation results (samples points 1 through 100):
e1 always-on energy consumed: 100 Watt-samples
e1 energy consumed: 59 Watt-samples, Prob{e11on==1}: 0.59
e2 always-on energy consumed: 50 Watt-samples
e2 energy consumed: 44.5 Watt-samples, Prob{e22on==1}: 0.89
System always-on total energy: 150 Watt-samples
System energy consumed: 103.5 Watt-samples, consumed/always-on: 0.69
Energy savings: 46.5 Watt-samples, saved/always-on: 0.31

| i | r1 | r2 | e11on | e12on | e21on | e22on | rc1 | rc2 | |
|---|---|---|---|---|---|---|---|---|---|
| 003 | 0.219 | 0.527 | 0 | 1 | 0 | 1 | 0.000 | 0.746 | energy savings, e1 off |
| 008 | 0.047 | 0.092 | 0 | 1 | 0 | 1 | 0.000 | 0.139 | energy savings, e1 off |
| 013 | 0.679 | 0.654 | 1 | 1 | 1 | 1 | 0.679 | 0.654 | normal |
| 018 | 0.679 | 0.416 | 1 | 0 | 1 | 0 | 1.095 | 0.000 | energy savings, e2 off |
| 023 | 0.935 | 0.701 | 1 | 1 | 1 | 1 | 0.935 | 0.701 | normal |
| 028 | 0.384 | 0.910 | 1 | 1 | 1 | 1 | 0.384 | 0.910 | normal |
| 033 | 0.519 | 0.762 | 1 | 1 | 1 | 1 | 0.519 | 0.762 | normal |
| 038 | 0.831 | 0.262 | 1 | 0 | 1 | 0 | 1.093 | 0.000 | energy savings, e2 off |
| 043 | 0.035 | 0.047 | 0 | 1 | 0 | 1 | 0.000 | 0.082 | energy savings, e1 off |
| 048 | 0.053 | 0.736 | 0 | 1 | 0 | 1 | 0.000 | 0.790 | energy savings, e1 off |
| 053 | 0.530 | 0.328 | 0 | 1 | 0 | 1 | 0.000 | 0.858 | energy savings, e1 off |
| 058 | 0.671 | 0.633 | 1 | 1 | 1 | 1 | 0.671 | 0.633 | normal |
| 063 | 0.008 | 0.756 | 0 | 1 | 0 | 1 | 0.000 | 0.764 | energy savings, e1 off |
| 068 | 0.383 | 0.991 | 1 | 1 | 1 | 1 | 0.383 | 0.991 | swap possible |
| 073 | 0.067 | 0.365 | 0 | 1 | 0 | 1 | 0.000 | 0.432 | energy savings, e1 off |
| 078 | 0.417 | 0.247 | 0 | 1 | 0 | 1 | 0.000 | 0.665 | energy savings, e1 off |
| 083 | 0.687 | 0.983 | 1 | 1 | 1 | 1 | 0.687 | 0.983 | swap possible |
| 088 | 0.589 | 0.723 | 1 | 1 | 1 | 1 | 0.589 | 0.723 | normal |
| 093 | 0.930 | 0.753 | 1 | 1 | 1 | 1 | 0.930 | 0.753 | normal |
| 098 | 0.846 | 0.652 | 1 | 1 | 1 | 1 | 0.846 | 0.652 | normal |

20 data-rate samples displayed

| Name | Size | Bytes | Class |
|---|---|---|---|
| comment | 1 × 100 | 12130 | cell array |
| e11on | 1 × 101 | 808 | double array |
| e12on | 1 × 101 | 808 | double array |
| e1energy | 1 × 100 | 800 | double array |

-continued

| Listing | | | |
|---|---|---|---|
| e1pon | 1 × 1 | 8 | double array |
| e1rmax | 1 × 1 | 8 | double array |
| e21on | 1 × 101 | 808 | double array |
| e22on | 1 × 101 | 808 | double array |
| e2energy | 1 × 100 | 800 | double array |
| e2pon | 1 × 1 | 8 | double array |
| e2rmax | 1 × 1 | 8 | double array |
| energymax | 1 × 100 | 800 | double array |
| listlimit | 1 × 1 | 8 | double array |
| m | 1 × 1 | 8 | double array |
| n | 1 × 1 | 8 | double array |
| r1 | 1 × 100 | 800 | double array |
| r1q | 1 × 101 | 808 | double array |
| r2 | 1 × 100 | 800 | double array |
| r2q | 1 × 101 | 808 | double array |
| rc1 | 1 × 101 | 808 | double array |
| rc2 | 1 × 101 | 808 | double array |
| start | 1 × 1 | 8 | double array |
| warnings | 1 × 1 | 8 | double array (global) |

Grand total is 2882 elements using 22666 bytes

What is claimed is:

1. A method comprising:
comparing input information into two or more access points, the two or more access points each having respective controllers being operated synchronously with each other, the two or more access points having overlapping radio coverage to at least one user equipment in a wireless communication network, the input information being compared based upon one or more scenarios operable to minimize energy consumption;
identifying one or more energy conservation constraints in the wireless communication network based on the comparison of the input information; and
controlling each of the two or more access points using said respective synchronous controllers to selectively distribute traffic through at least one of the two or more access points based upon the one or more energy conservation constraints.

2. The method in claim 1, where a plurality of distributed power controllers determines whether to enable or disable at least one of the two or more access points to selectively distribute traffic through said at least one of the two or more access points based upon the one or more energy conservation constraints.

3. The method in claim 2, where at least one distributed power controller powers on or off one or more access points based upon at least a traffic load, a traffic capacity, an energy savings, or one or more operational constraints.

4. The method in claim 3, where the one or more operational constraints comprise:
a minimum quality of service;
a time of day;
a calendar date; and
a probability of traffic routing failure.

5. The method in claim 3, where a distributed synchronous traffic controller routes traffic to one or more enabled access points.

6. The method of claim 5, where a radio resource of each of the two or more access points acquires state information regarding traffic rates and resource capacity of one another, and the distributed synchronous power controller and distributed synchronous traffic controller determine which one of the two or more access points to process traffic based upon the state information.

7. The method of claim 6, wherein one or more access points are not required to exchange controller results to acquire the state information.

8. The method of claim 5, where the distributed traffic controller routes traffic to any one of the one or more access points that are enabled, and clears traffic based on the operational constraints.

9. The method of claim 8, where traffic routing further comprises:
handing off traffic to a remote wireless communication network; and
simulcasting to the remote wireless communication network.

10. The method of claim 1, where the one or more access points comprise:
a transmitter of a channel of a sector of a wireless communication base station;
a transmitter of a group of channels of a sector of a wireless communication base station;
a sector of a wireless communication base station; or
a wireless communications base station.

11. An apparatus, comprising:
a processor; and
a memory including computer program code, where the memory and computer program code are configured, with the processor, to cause the apparatus to:
compare input information into two or more access points, the two or more access points each having respective controllers being operated synchronously with each other, the two or more access point having overlapping radio coverage to at least one user equipment in a wireless communication network, the input information being compared based upon one or more scenarios operable to minimize energy consumption;
identify one or more energy conservation constraints in the wireless communication network based on the comparison of input information; and
control each of the two or more access points using said respective synchronous controllers to selectively distribute traffic through at least one of the two or more access points based upon the one or more energy conservation constraints.

12. The apparatus in claim 11, further comprising at least one distributed power controller configured to determine whether to enable or disable at least one of the two or more access points to selectively distribute traffic through said at least one of the two or more access points based upon the one or more energy conservation constraints.

13. The apparatus in claim 12, where the distributed power controller powers on or off one or more access points based upon at least a traffic load, a traffic capacity, an energy savings or one or more operational constraint.

14. The apparatus in claim 13, where the one or more operational constraints comprise:
   a minimum quality of service;
   a time of day;
   a calendar date; and
   a probability of traffic routing failure.

15. The apparatus in claim 11, further comprising:
   a distributed synchronous traffic controller configured to route traffic to one or more enabled access points.

16. The apparatus in claim 15, where a radio resource of each of the two or more access points is informed of traffic rates and resource capacity of one another and the distributed synchronous power controller and distributed synchronous traffic controller determine which one of the two or more access points to process traffic based upon the traffic rates and resource capacity.

17. The apparatus in claim 15, where the distributed traffic controller routes traffic to any one of the one or more access points that are enabled and clears traffic based on the operational constraints.

18. The apparatus in claim 17, where traffic routing further comprises:
   handing off traffic to a remote wireless communication network; and
   simulcasting to the remote wireless communication network.

19. The apparatus in claim 11, where the one or more access points comprise:
   a transmitter of a channel of a sector of a wireless communication base station;
   a transmitter of a group of channels of a sector of a wireless communication base station;
   a sector of a wireless communication base station; or
   a wireless communications base station.

20. A non-transitory computer readable medium storing a program of machine-readable instructions executable by a digital processing apparatus of a computer system to perform operations for controlling computer system, said actions comprising:
   comparing input information into two or more access points, the two or more access points each having respective controllers being operated synchronously with each other, the two or more access points having overlapping radio coverage to at least one user equipment in a wireless communication network, the input information being compared based upon one or more scenarios operable to minimize energy consumption;
   identifying one or more energy conservation constraints in the wireless communication network based on the comparison of the input information; and
   controlling each two or more access points using said respective synchronous controllers to selectively distribute traffic through at least one of the two or more access points based upon the one or more energy conservation constrains constraints.

21. The method in claim 2, where a first distributed power controller of the plurality of distributed power controllers outputs a first control decision signal to enable or disable a respective access point of the two or more access points, a second distributed power controller of the plurality of distributed power controllers outputs a second control decision signal to enable or disable another respective access point of the two or more access points, the first distributed power controller outputs a copy of the second control decision signal and the second distributed power controller outputs a copy of the first control decision signal so that control decisions output by the first distributed power controller and the second distributed power controller are the same.

* * * * *